United States Patent [19]

Sakamoto et al.

[11] Patent Number: 5,048,956
[45] Date of Patent: Sep. 17, 1991

[54] BORESCOPE APPARATUS

[75] Inventors: Nobuyuki Sakamoto, Hachioji; Yasuhiro Ueda, Kokubunji; Atsushi Miyazaki, Hachioji; Yoshio Shishido; Toshiaki Nishikori, both of Sagamihara; Shinichi Nishigaki, Tokyo; Morihide Mizumoto, Hachioji; Takeaki Nakamura, Hino; Eiichi Fuse; Yoshisada Aoki, both of Hachioji, all of Japan

[73] Assignee: Olympus Optical Co., Ltd., Tokyo, Japan

[21] Appl. No.: 450,299

[22] Filed: Dec. 13, 1989

[30] Foreign Application Priority Data

Dec. 16, 1988 [JP] Japan .................................. 63-318217
Oct. 3, 1989 [JP] Japan .................................. 1-258158

[51] Int. Cl.⁵ ............................................. G02B 23/26
[52] U.S. Cl. .................................................. 356/241
[58] Field of Search ..................... 356/241; 350/96.26; 128/4, 6

[56] References Cited

U.S. PATENT DOCUMENTS

| 4,601,283 | 7/1986 | Chikama | 128/4 |
| 4,735,501 | 4/1988 | Ginsburgh et al. | 396/241 |
| 4,799,474 | 1/1989 | Ueda | 128/4 |
| 4,832,473 | 5/1989 | Ueda | 350/96.26 |

Primary Examiner—Richard A. Rosenberger
Attorney, Agent, or Firm—Frishauf, Holtz, Goodman & Woodward

[57] ABSTRACT

A borescope apparatus comprises an insertion section having a bending portion and a flexible portion, a bending mechanism for bending the bending portion under the pressure of supplied fluid, a pressurized fluid supplying unit for supplying the fluid to the jet port and the bending mechanism and a flow control unit for controlling the fluid supplied to jet ports which are provided in the distal end of either the bending portion or flexible portion and the bending mechanism.

23 Claims, 19 Drawing Sheets

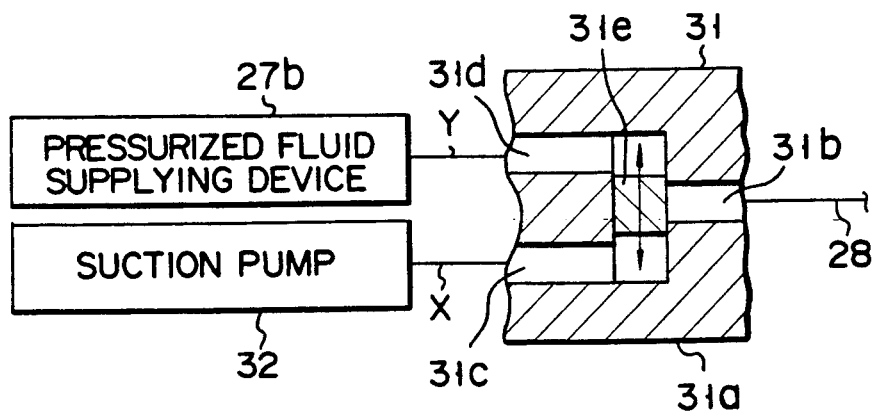
F I G. 4
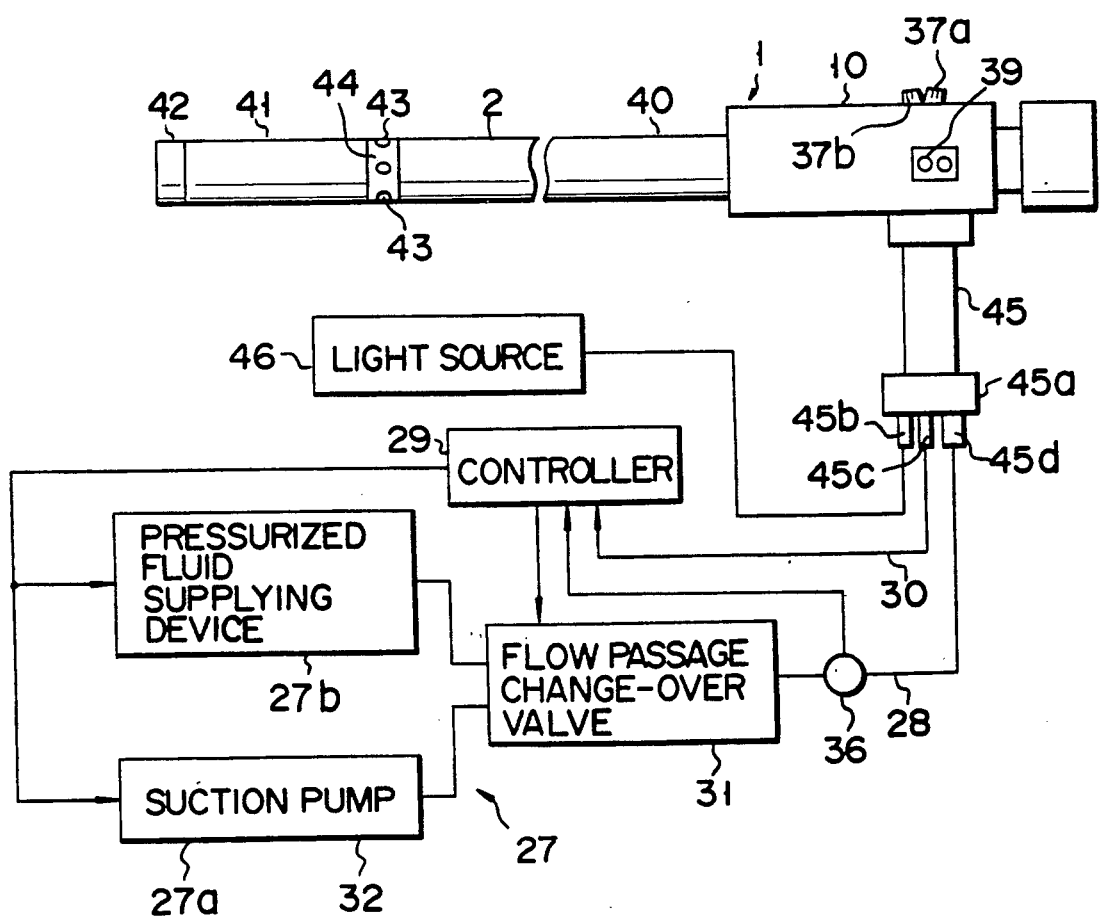
F I G. 5

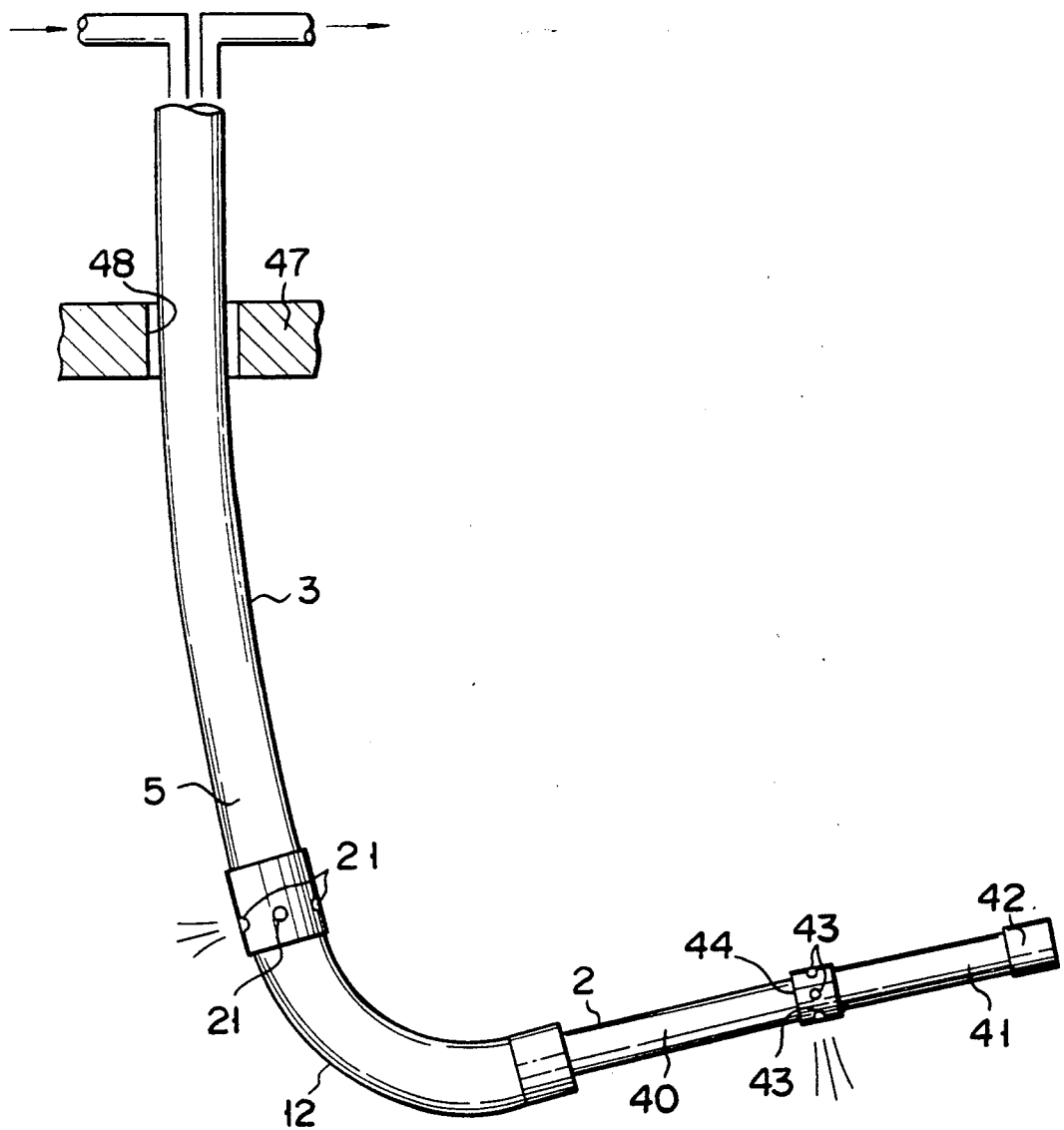
F I G. 6

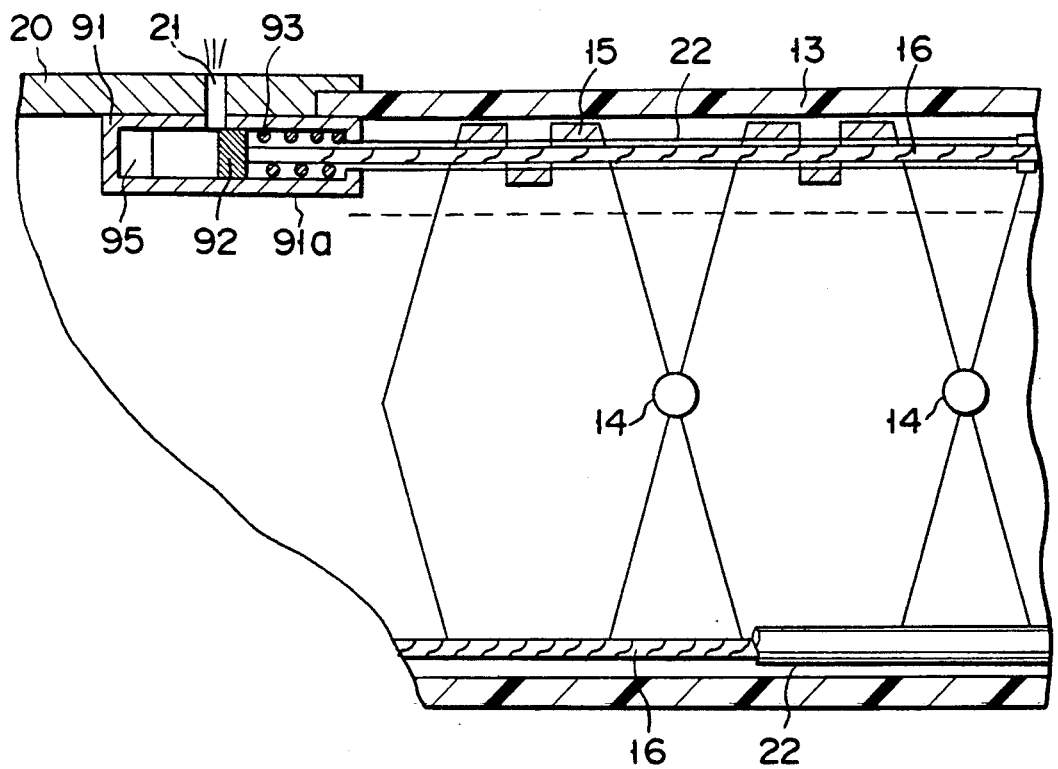
F I G. 12
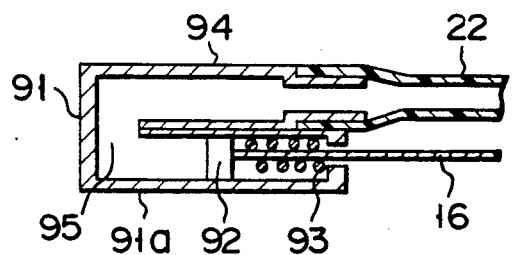
F I G. 13
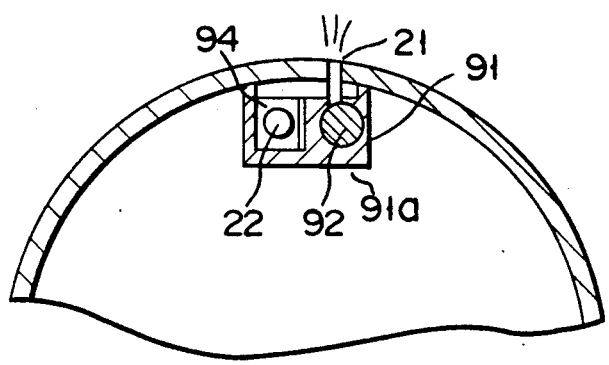
F I G. 14

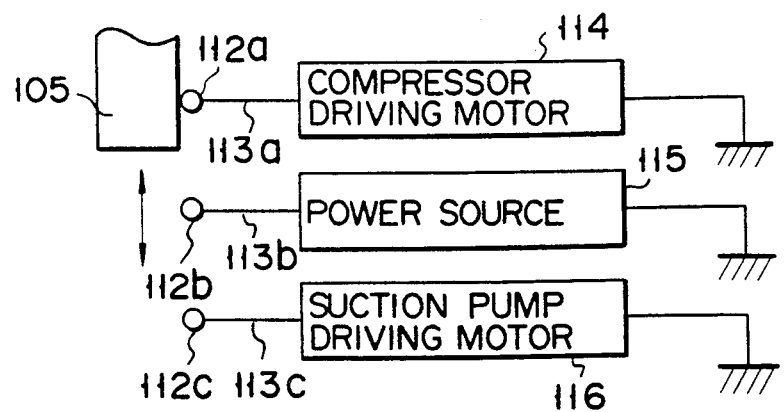
FIG. 17
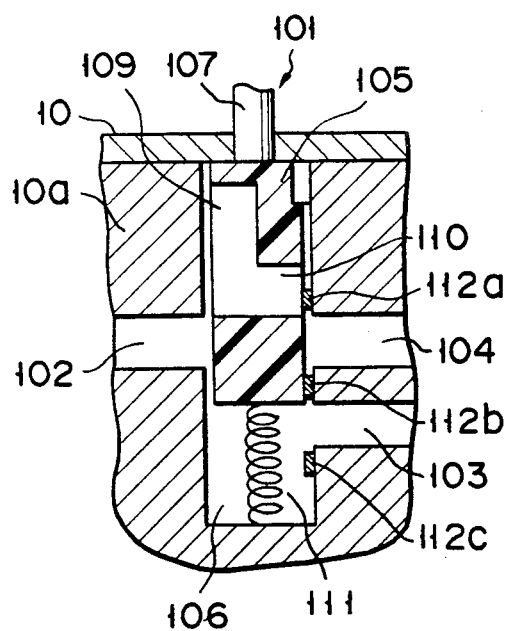 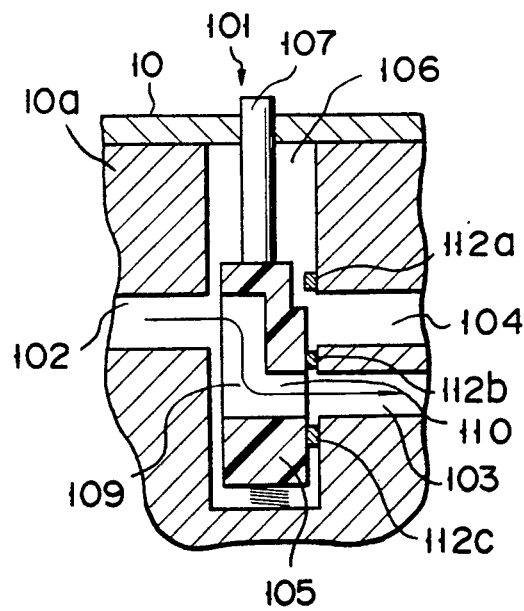
FIG. 18     FIG. 19

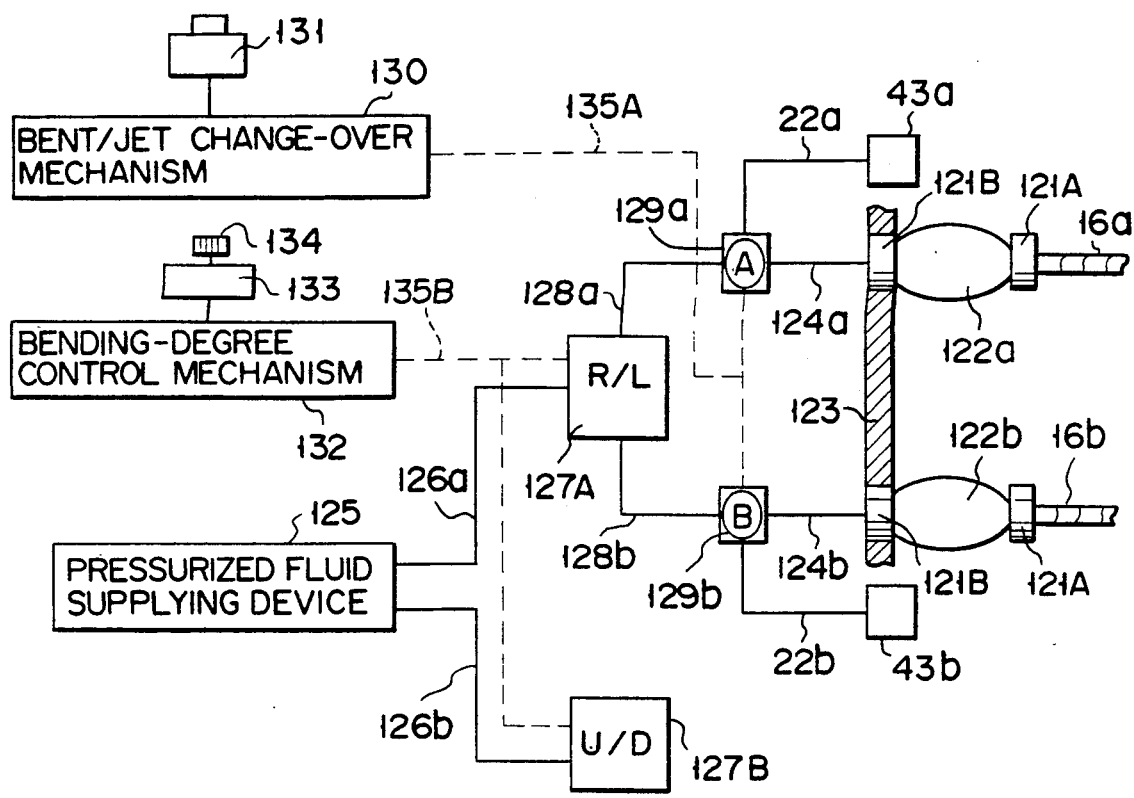
F I G. 21
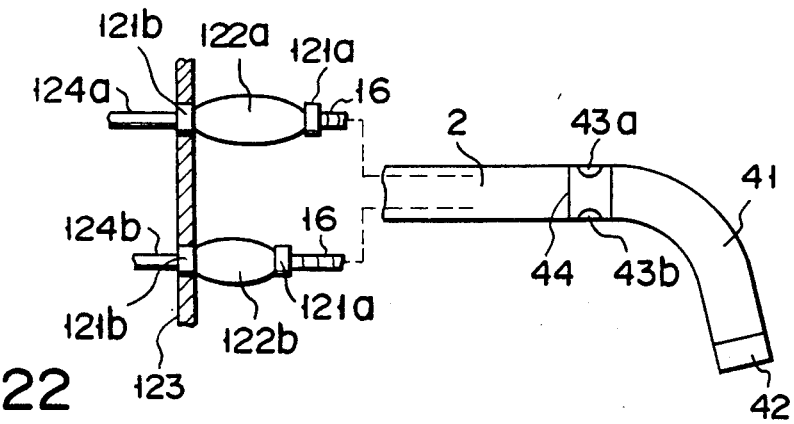
F I G. 22
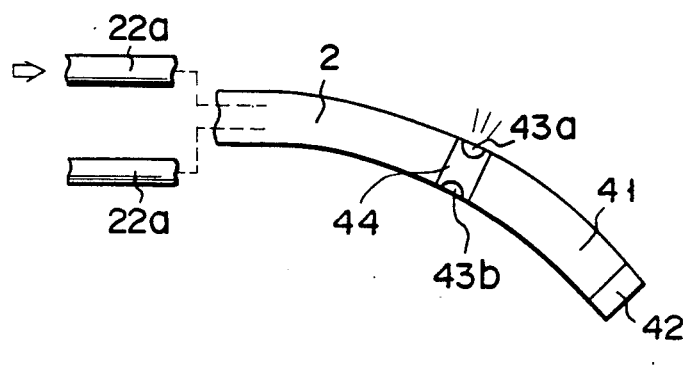
F I G. 23

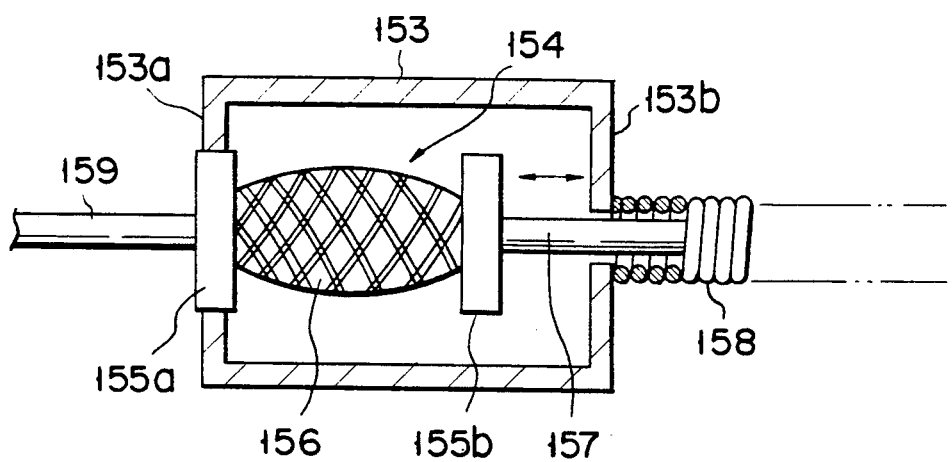
F I G. 26

BORESCOPE APPARATUS

BACKGROUND OF THE INVENTION

1. Field of the Invention

This invention relates to a floating type industrial borescope for observing the interior of pipings, the bodies and the wings of airplanes, and the like.

2. Description of the Related Art

In a typical borescope, a bending device has been known for bending that flexible tube of the guide tube section which is introduced in the insertion section or enables the insertion section to be guided in an object to be observed. The bending device is constructed such that air cylinders for operating the bending portion of the flexible tube are assembled in the device and wires for bending the bending portion of the flexible tube are connected to pistons in the air cylinders. The wires are pushed or pulled by the air cylinders to bend the bending portion of the flexible tube. An air supplying tube has its distal end connected to each air cylinder and its proximal end to a suction device provided in the operating portion or an air pump. In the air cylinder is mounted a spring member for holding the piston in a predetermined position. At the normal time, i.e., when the flexible tube is not bent, the piston is held in the predetermined position, and the bending portion extends substantially linearly to assume a normal state. The operation of a bending knob provided on the operating section drives the suction device or the air pump to suck the air out of, or supplying the same to the air cylinder through the air supplying tube. This enables the piston to move in the air cylinder and the bending portion of the flexible tube to be bent in cooperation with the movement of the pistons.

With this bending device, since the operating wires are pushed or pulled by the air cylinders to bend only the bending portion of the flexible tube, the overall flexible tube cannot be bent. This poses a problem that the radius of curvature of the bending portion is relatively small.

U.S. Pat. No. 4,735,501 discloses a typical borescope apparatus in which a fluid jet nozzles are provided in the distal end of the cable of a flexible borescope and the cable of the borescope is propelled by the fluid jet ejected from the fluid jet nozzles. It may be possible to bend the flexible tube by the fluid injection from the fluid jet nozzles.

Since the flexible tube is bent by the fluid injection from the fluid jet nozzles, the overall flexible tube can be curved with this borescope apparatus. However, it also encounters a problem that only the distal portion of the flexible tube cannot be bent.

SUMMARY OF THE INVENTION

An object of this invention is to provide a borescope apparatus in which the operativeness is improved and the observation range is widened.

Another object of this invention is to provide a borescope apparatus in which a small bending operation attained by bending only the bending portion of the flexible tube and a large bending operation obtained by curving the overall flexible tube can be selected or both operations can be carried out simultaneously.

These objects are attained by a borescope comprising an insertion section having a bending portion and a flexible portion, fluid jet ports provided in either one of the bending portion and the flexible portion, bending means for bending the bending portion under a supplied fluid pressure, pressurized fluid supplying means for supplying fluid to the jet ports and the bending means, and fluid control means for controlling the fluid supplied to the jet ports and the bending means.

With the borescope according to this invention, the bending portion can be bent at a relatively small radius of curvature by means of the bend means and the flexible portion can be curved at a relatively large radius of curvature by ejecting fluid from the jet ports.

BRIEF DESCRIPTION OF THE DRAWINGS

FIG. 4 is a cross-sectional view of the main part of a directional control valve of the above-mentioned air supply/suction unit;

FIG. 5 is a diagrammatic view of the whole structure of the above-mentioned borescope apparatus;

FIG. 6 is a side view of the operating insertion section on which a guide tube is provided;

FIG. 12 is a cross-sectional view of the main part of the driving mechanism of the bending portion of the borescope apparatus in FIG. 11;

FIG. 13 is a longitudinal sectional view of the driving cylinder of the driving mechanism;

FIG. 14 is a cross-sectional view of the bending portion in FIG. 12;

FIG. 17 is a change-over switch provided for the fluid passage change-over valve;

FIGS. 18 and 19 show how the fluid passage change-over valve operates;

FIG. 21 is a block diagram of the driving mechanism of the borescope apparatus in FIG. 20;

FIG. 22 is a side view of the insertion section bent at a small radius of curvature;

FIG. 23 is a side view of the insertion section bent at a large radius of curvature;

FIG. 26 is a side view of the actuator in FIG. 26;

DETAILED DESCRIPTION OF THE PREFERRED EMBODIMENTS

This invention will be explained by way of examples with reference to the accompanying drawings.

Figure 1:
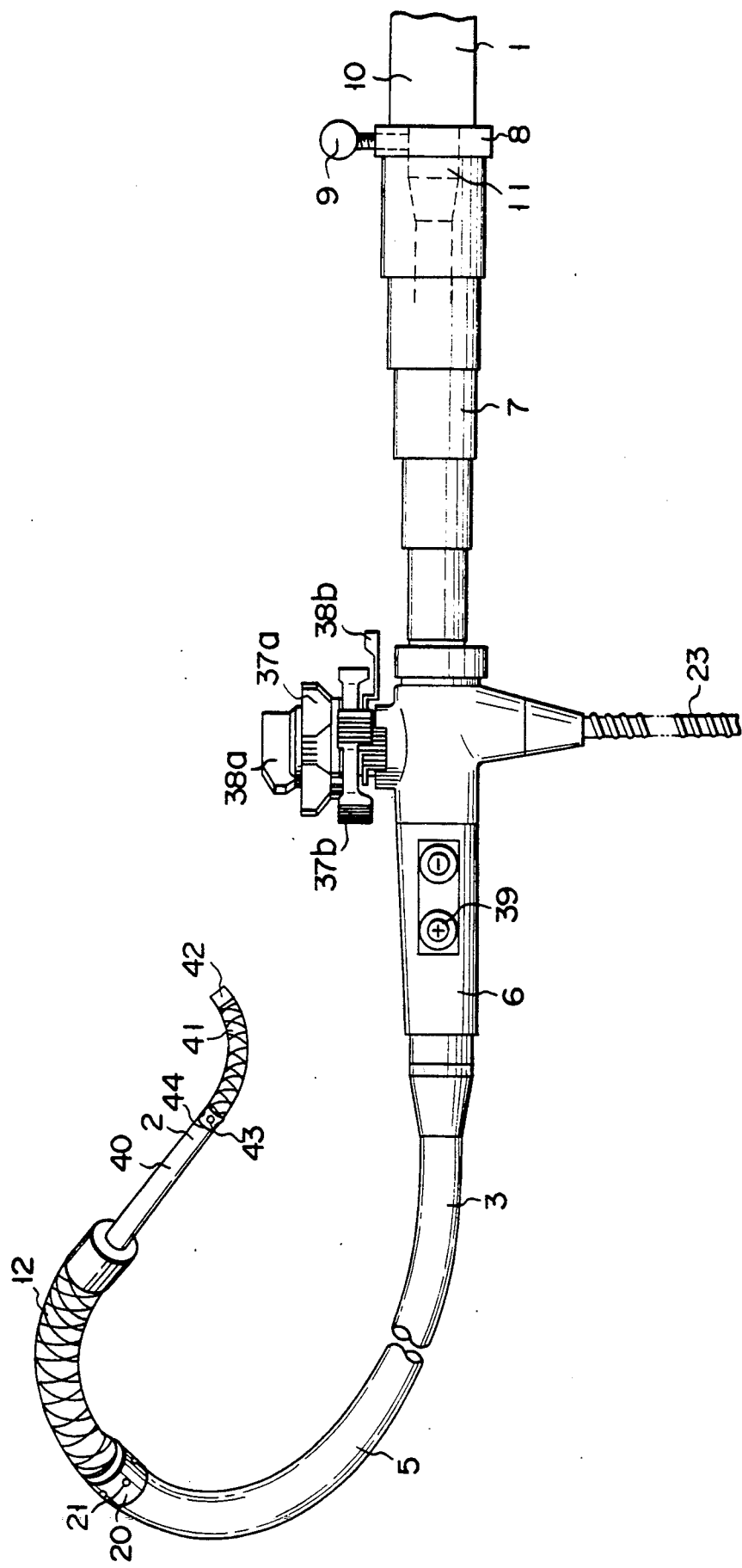
FIG. 1 is a side view of the insertion section of a borescope and a guide tube provided on the flexible portion of the insertion section according to one embodiment of this invention.
Figure 2:
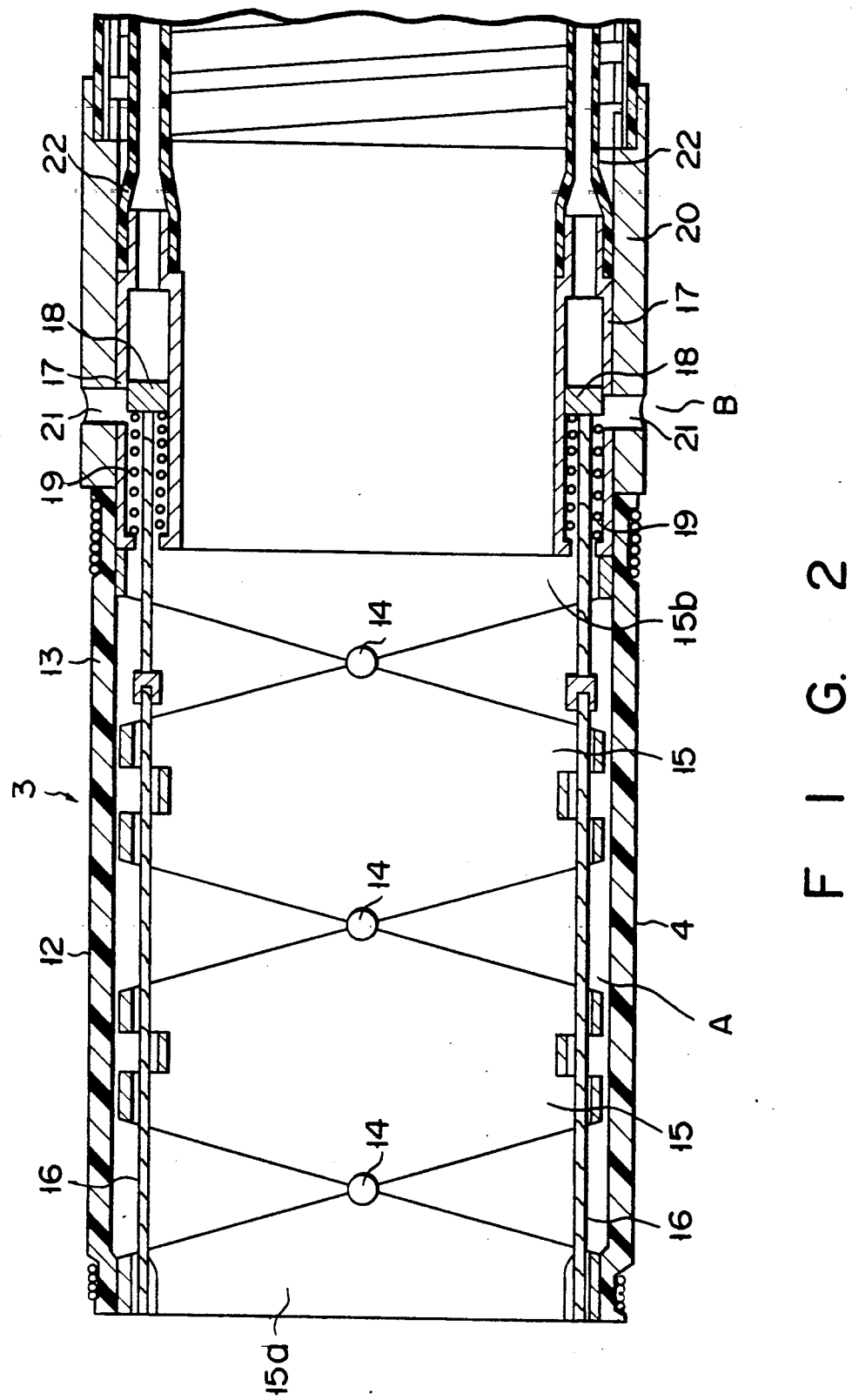
FIG. 2 is a longitudinal sectional view of the driving mechanism of a bending portion in FIG. 1.

FIGS. 1 to 8 show the first embodiment of this invention. In FIG. 1, an electronic borescope 1 is provided on a borescope guide tube 3. FIG. 2 shows the main part of a bend device for bending a flexible tube 4 of the borescope guide tube 3 which guides the insertion section 2 of the borescope 1 as shown in FIG. 1 and introduces the same into an object to be inspected. The guide tube 3 has a flexible insertion portion 5 adapted to be inserted into the object to be inspected, an operating portion 6 connected to the proximal end of the insertion portion 5 and a telescopic portion 7 connected to the proximal end of the operating portion 6. Attached to the proximal end of the telescopic portion 7 is a connecting ring (a borescope fixing member) 8 on which a fixing screw 9 is provided. Upon fixing the guide tube 3 to the borescope 1, the connecting ring 8 is mounted on the proximal end of the reinforcing part 11 of the operating section 10 of the borescope 1 and is fixed to the borescope 1 by means of the fixing screw 9.

As shown in FIG. 2, a bending portion 12 is provided on the distal end of the insertion portion 5 of the guide tube 3. In a flexible outer tube 13 of the bending portion 12 are arranged a plurality of cylindrical segments 15, each of which is pivoted at both end portions by connecting pin 14 to the respective ends of the adjacent cylindrical segments 15. The distal ends of four operating wires 16 are fixed to the inner face of the front cylindrical segment 15a. In this embodiment, the four wires 16 are arranged parallel to each other and separated equidistantly in the circumferential direction (at the intervals of 90 degrees) in the bending portion 12. In FIG. 2, a pair of wires 16 located on the upper and lower wall portions are shown, but another pair of wires 16 disposed on the right and left wall portions are omitted. The same number of driving cylinders 17 as the operating wires 16 are provided adjacent to the rearmost cylindrical segment 15b. Each driving cylinder 17 is of an air cylinder type. The proximal end of the corresponding wire 16 is fixed to a piston 18 in each driving cylinder 17. Within each driving cylinder 17 is disposed a spring member 19 which holds the piston 18 in a neutral position.

A cylindrical jet port member 20 is provided in the proximal end portion of the bending portion 12 of the guide tube 3 and is formed with jet ports 21 separated circumferentially of the member 20 and directed in the required four directions in which the bending portion 12 is bent. Each jet port 21 communicates with the interior of the corresponding driving cylinder 17 and is blocked by the cylinder 18 in a state in which the piston 18 is held in a neutral position in the cylinder 17.

Figure 3:
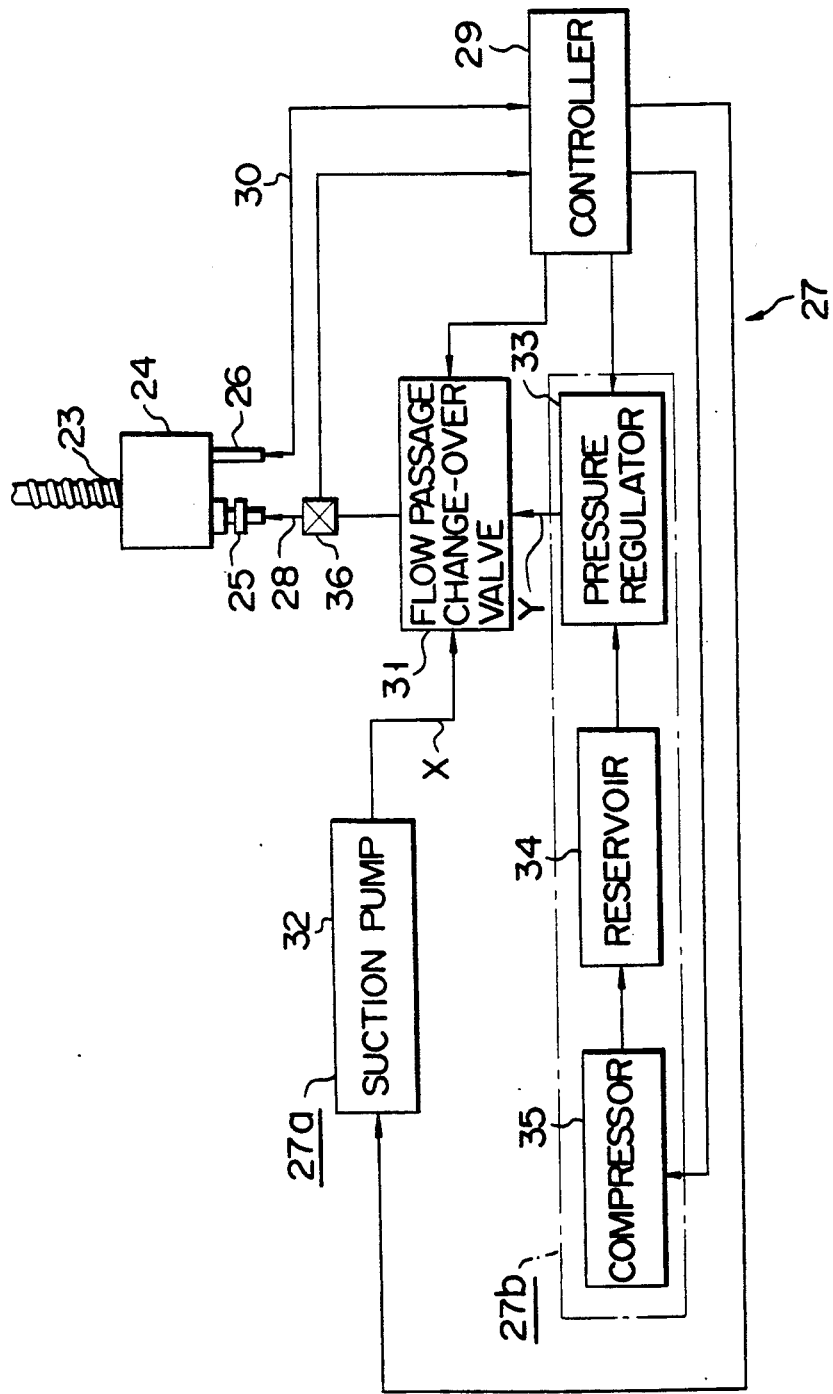
FIG. 3. is a block diagram of the air-supply/suction unit of the above-mentioned borescope apparatus.
Figure 7:
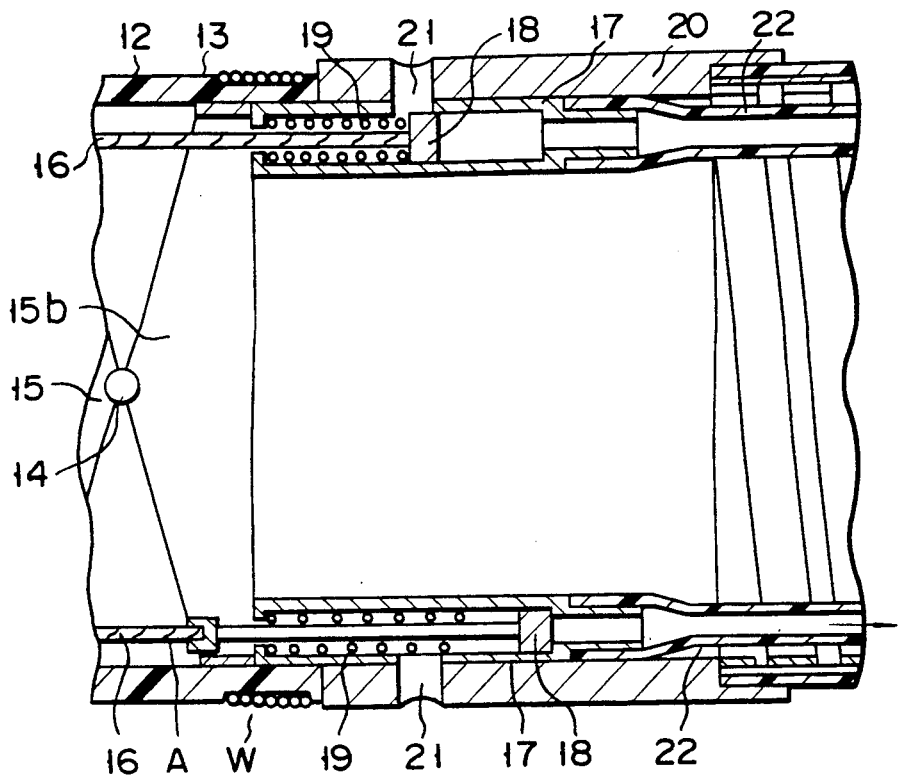
FIGS. 7 and 8 are cross-sectional views of the main part of the driving mechanism of the operating bending portion.

The distal end of each air supplying tube 22 is connected to the proximal end of the respective driving cylinder 17. Each air supplying tube 22 extends through the insertion portion 5 of the guide tube 3 and the operating portion 6, and its proximal end extends in a universal cord 23. As shown in FIG. 3, a connector 24 has a tube connecting terminal 25 and a signal terminal 26 and is connected to the universal cord 23. The proximal end of each air supplying tube 22 is connected to the tube connecting terminal 25 of the connector 24.

An air supplying tube 28 of an air supply/suction device 27 is detachably connected to the tube connecting terminal 25 of the connector 24, and a signal line 30 of the controller 29 of the air supply/suction device 27 is also detachably connected to the signal terminal 26. The air supply/suction device 27 is provided with a suction unit 27a and a pressurized fluid supplying unit 27b. A fluid passage change-over valve 31 is connected to the air supplying tube 28 of the air supply/suction device 27. To the fluid passage change-over valve 31 are connected a suction pump 32, on one hand, and a compressor 35 through a pressure regulator 33 and a reservoir 34, on the other hand. As shown in FIG. 4, the fluid passage change-over valve 31 has a valve body 31a in which are formed a communication hole 31b communicating with the air supplying tube 28, a communication hole 31c communicating with the suction pump 32 and a communication hole 31d communicating with the pressurized fluid supplying unit 27b. A valve body 31e for changing the fluid passages is disposed so as to be vertically movably between the communication hole 31b and the communication holes 31c and 31d, as shown in FIG. 4. As the valve body 31e of the fluid passage change-over valve 31 moves, the change-over takes place between the connection of the communication hole 31b with a fluid passage X led to the suction pump 32 and with a fluid passage Y led to the pressurized fluid supplying unit 27b, and, at the same time, the degree of the opening of the valve varies in proportion to the movement of the valve body 31e. To the controller 29 are connected a pressure sensor 36 attached to the air supplying tube 28 of the air supply/suction device 27, the fluid passage change-over valve 31, the suction pump 32, the pressure regulator 33 and the compressor 35.

The operating portion 6 of the guide tube 3 has vertically and horizontally bending knobs 37a and 37b of a first bending mechanism A for small bending, angle lock knobs 38a and 38b, and second bending mechanism B comprising a pressure control switch 39 for bending the overall insertion portion 5 of the guide tube 3. The bending knobs 37a and 37b, the angle lock knobs 38a and 38b, and the pressure control switch 39 are connected to the signal terminal 26 through a signal cable, not shown, and is further connected to the controller 29 of the air supply/suction device 27 through the signal line 30 connected to the signal terminal 26. When the bending knobs 37a and 37b are operated, the valve body 31e is moved upward in FIG. 4. As the fluid passage A led to the suction pump 32 is connected to the air supplying tube 28, the suction pump 32 is driven to stop the compressor 35. The air in one of the air supplying tubes 22, for example, the lower air supplying tube 22 in FIG. 2 is sucked, and the piston 10 in the driving cylinder 17 is moved to the sucked direction (to the right direction in FIG. 2) against the biasing force of the spring 19, whereby the bending portion 12 is bent toward one direction (downward in FIG. 2). In other words, small bending is carried out. The operation of the pressure control switch 39 causes the controller 29 to move the valve body 31e of the fluid passage change-over valve 31 downward in FIG. 4, and the fluid passage B led to the pressurized fluid supplying device 27 is connected to the air supplying tube 28. The pressurized fluid such as compressed air discharged from the compressor 35 is supplied to one of air supplying tubes 22, for example, the upper air supplying tube 22 in FIG. 2 through the reservoir 34, the pressure regulator 33, the fluid passage change-over valve 31, the air supplying tube 28 and the tube connecting terminal 25 of the connector 24. As a result, the piston 18 in the driving cylinder 17 is pushed leftward in FIG. 2 against the biasing force of the spring member 19 by the pressure of air flowing in the driving cylinder 17 and the jet port 21 is opened. In this state, the ejection of the pressurized air flowing in the driving cylinder 17 from the jet port 21 to the outside of the driving cylinder 17 applies to the distal end portion of the insertion portion 5 of the guide tube 3 a propelling force in the direction opposite to the ejected direction of the pressurized air and allows the whole insertion portion 5 to be gradually bent downward in FIG. 2 from the distal end thereof.

As shown in FIG. 5, the flexible insertion section 2 to be passed through the guide tube 3 is connected to the operating section 10 of the borescope 1. The insertion section 2 is formed by arranging and connecting to each other a flexible tube portion 40, a bending portion 41 and a distal structural portion 42 in succession as seen from the proximal side of the borescope 1. The bending portion 41 of the borescope 1 has the substantially same structure as that of the bending portion 12 of the guide tube 3. The bending portion 42 is provided on its rear end with a jet port member 44 formed with jet ports 43 similar to the jet ports 21 of the guide tube 3. Just like the operating portion 6 of the guide tube 3, the operating section 10 of the borescope 1 is provided with bend knobs 37a and 37b for operating the first bending mechanism A which bends the bending portion 41, angle lock knobs 38a and 38b, and a pressure control switch 39 for operating the second bending mechanism B which bends the whole insertion portion 2 of the borescope 1. A universal cord 45 is connected to the operating portion 10. To the distal end of the universal cord 45 is connected a connector 45a which is provided with a connecting terminal 45b made of glass fiber. Like the connector 24 of the guide tube 3, the connector 45a is also provided with a tube connecting terminal 45c and a signal terminal 45d. As shown in FIG. 5, a light source device 46 is connected to the fiber connecting terminal 45d. To the connecting terminal 45d is detachably connected the air supply tube 28 of an air supply/suction device 27 which has the same structure as the guide tube 3. To the signal terminal 45c is also detachably connected the signal line 30 of the controller 29 of the air supply/suction device 27. The air supply/suction device 27 of the borescope 1 has the same structure as that of the guide tube 3, the detailed description thereof being omitted. Just like the guide tube 3, the borescope 1 is operated such that the small bending attained by the local bending of the bending portion 41 and the large bending occurring from the curving of the whole inserting portion of the borescope 1.

The operation of the borescope apparatus according to the first embodiment will be explained. First, the air supplying tube 28 of the air supply/suction device 27 is connected to the tube connecting terminal 25 of the connector 24 of the guide tube 3, and the signal line 30 of the controller 29 of the air supply/suction device 27 is connected to the signal terminal 26. Likewise, the air supplying tube 28 of the air supply/suction device 27, the signal line 30 of the controller 29 of the air supply/suction device 27, the light source for illumination and the camera control unit are connected to the borescope 1. Further, the insertion section 2 of the borescope 1 is inserted in the guide tube 3, and the mounting ring 8 of the guide tube 3 is fixed to the reinforcing portion 11 of the borescope 1 by means of the fixing screw 9. Thereafter, the insertion section 2 of the guide tube 3 as well as the guide tube 3 is introduced into the object 47 to be inspected through a hole 48 formed in the outer wall of the object 47. While the borescope 1 together with the guide tube 3 is guided in the object 47 to be observed, the bending knobs 37a and 37b and the pressure control switch 39 are in the neutral positions, and thus the pistons 18 for the bending portions 12 and 41 of the guide tube 3 and the borescope 1 are held in the neutral positions. Therefore, the bending portions 12 and 41 and the inserting portions 5 and 40 of the guide tube 3 and the borescope 1 assume the substantially straight form so as to be held in the unbent standard state.

After the insertion section 2 of the borescope 1 as well as the guide tube 3 has reached the required location in the object 47 to be observed through the hole 48, the operating portion 6 of the guide tube 3, the bending knobs 37a and 37b or the pressure control switch 39 is operated. When the bending knob 37a of the operating portion 6 of the guide tube 3 is operated, for example, in the valve body 31e of the fluid passage change-over valve 31 is moved upward in FIG. 4 by the controller 29, the suction pump 32 is driven, and the compressor 35 is stopped. Then, the air in the air supplying tube 22 in response to the operation of the bending knob 37a, for example, the lower air supply tube 22 is sucked so as to move the piston 18 in the sucked direction (in the rightward direction in FIG. 7) in the cylinder 17. In accordance with the movement of the piston 18, the operating wire 16 is moved rightward in FIG. 7, and only the bending portion 12 of the inserting portion 5 is bent downward in FIG. 1, effecting small bending operation.

After only the bending portion of the guide tube 3 has been bent downward in FIG. 1, the bending portion 12 is locked to be held in the bent state by operating the angle lock knob 38.

Figure 8:
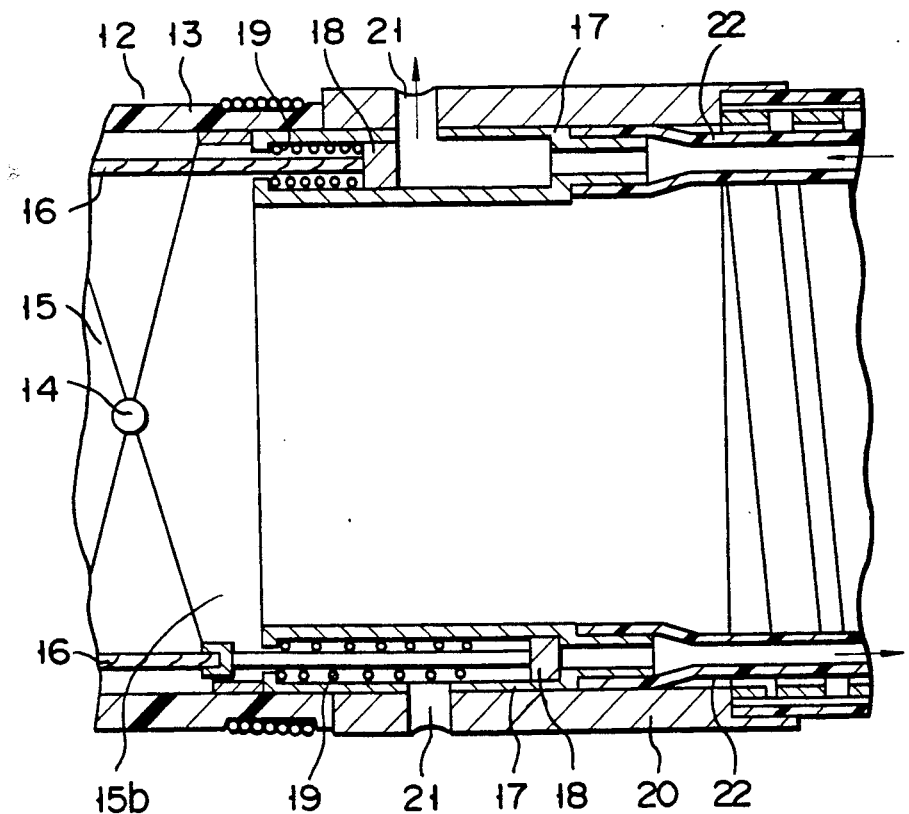

In this state, the operation of the pressure control switch 39 of the operating portion 6 of the guide tube 3 allows the controller 29 for the valve body 31e of the fluid passage change-over valve 31 to move downward in FIG. 4, and the fluid passage 35 led to the compressor 35 is connected to the air supplying tube 28. The pressurized fluid, such as compressed air, discharged from the compressor 35 is supplied to, for example, the upper air supplying tube 22 in FIG. 2 through the reservoir 34, the pressure regulator 33, the fluid passage change-over valve 31, the air supplying tube 28 and the connecting terminal 25 of the connector 24. It follows that the piston 18 is pushed leftward in the driving cylinder 17 against the biasing force of the spring member 19 as shown in FIG. 8 by the pressure of the air flowing in the driving cylinder 17 through the upper air supplying tube 22 in FIG. 1. Since the jet port 21 is opened, the compressed air is ejected therefrom to the outside of the jet port member 20. The inserting portion 5 of the guide tube 3 is applied at its distal end by a propelling force directed to the direction opposite to that in which the compressed air is ejected. As a result, the overall inserting portion 5 of the guide tube 3 is gradually curved downward in FIG. 1 thereby to carry out the large bending.

Likewise, the operation of the bending knobs 37a and 37b enables the bending portion 41 of the borescope 1 to perform small bending. Further, the pressure control switch 39 of the operating portion 10 of the borescope 1 is used to effect the large bending operation in which the whole inserting portion 2 of the borescope 1 is gradually curved from the distal end thereof.

In the first embodiment, the pressurized fluid is supplied by the fluid passage change-over valve 31 from the pressurized fluid supplying device 27b to the respective jet port 21 or 43, and the piston 18 of the bending mechanism A is sucked by the suction device 27. On one hand, the jet pressure of the pressurized fluid supplied from the pressurized fluid supplying device 27b to the jet port 21 or 43 conducts the large bending of the overall flexible tube 4 including the inserting portion 5 of the guide tube 3 and the inserting portion 2 of the borescope 1. On the other hand, upon sucking the air in the piston 18 of the bending mechanism A by means of the sucking device 27a, the small bending operation is performed in which only the bending portions 12 and 41 of the flexible tube 4 including the inserting portion 5 of the guide tube 3 and the inserting portion 2 of the borescope 1. With this structure, therefore, the small bending operation for bending only the bending portions 12 and 41 of the flexible tube 4 including the inserting portion 5 of the guide tube 3 and the inserting portion 2 of the borescope 1 and the large bending operation for bending the whole flexible tube 4 are selected according to the condition in which the borescope 1 is used. It is noted that this apparatus has the following technical advantages:

The operability of the flexible tube 4 including the inserting portion 5 of the guide tube 3 and the inserting portion 2 of the borescope 1 is much more improved than the conventional one thereby enhancing the easiness of the operation of the borescope 1.

Since the air supplying tube 22 is commonly used for the small and large bending operations, the diameter and the weight of the flexible tube 4 including the inserting portion 5 of the guide tube 3 and the inserting portion 2 of the borescope 1 are reduced.

Figure 9:
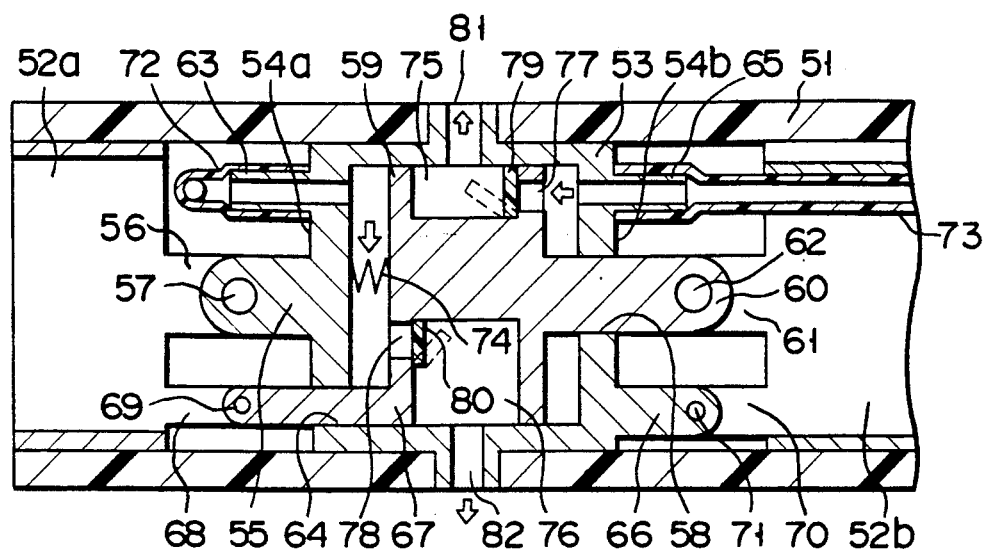
FIGS. 9 and 10 are longitudinal sectional view of the bending portion of the borescope apparatus according to the second embodiment of this invention.
Figure 10:
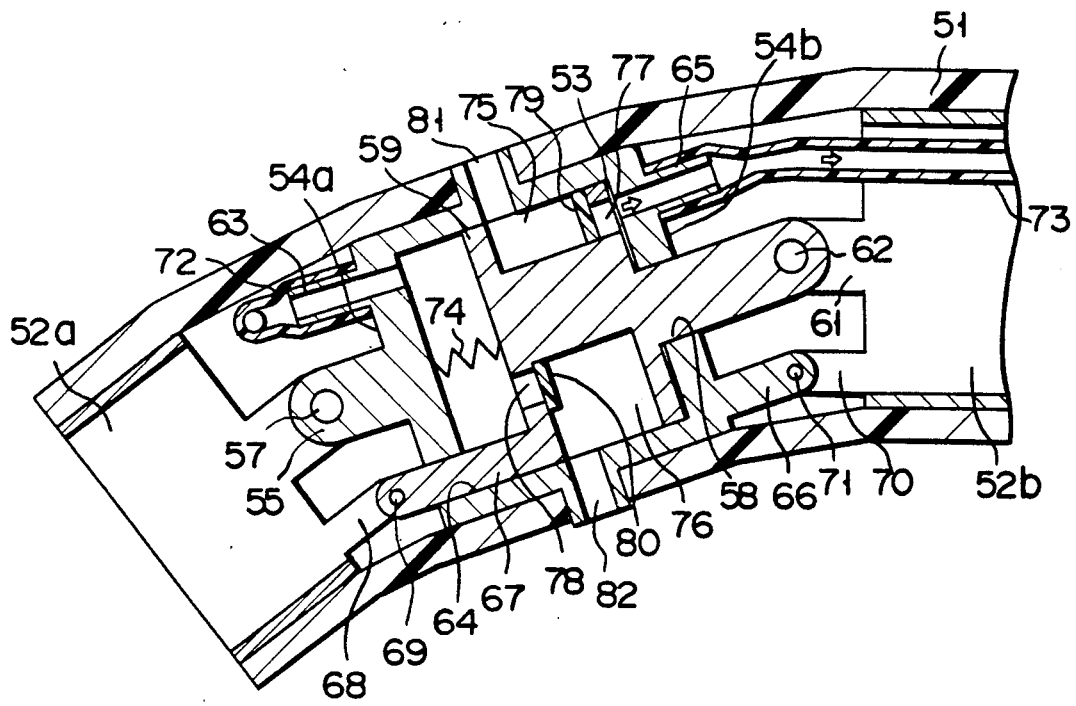
Figure 11:
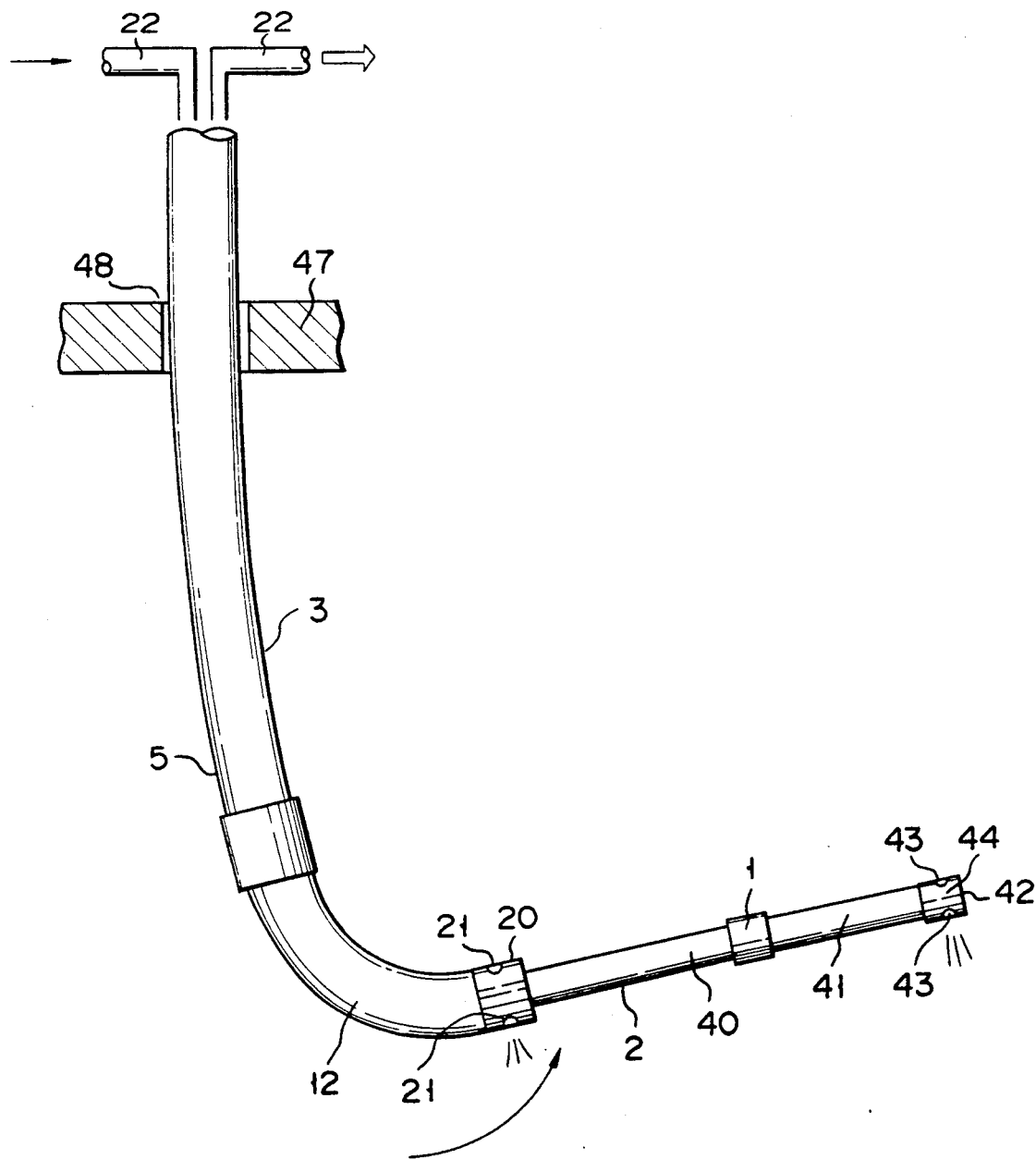
FIG. 11 is a side view of the insertion section of the borescope according to the third embodiment of this invention.
Figure 15:
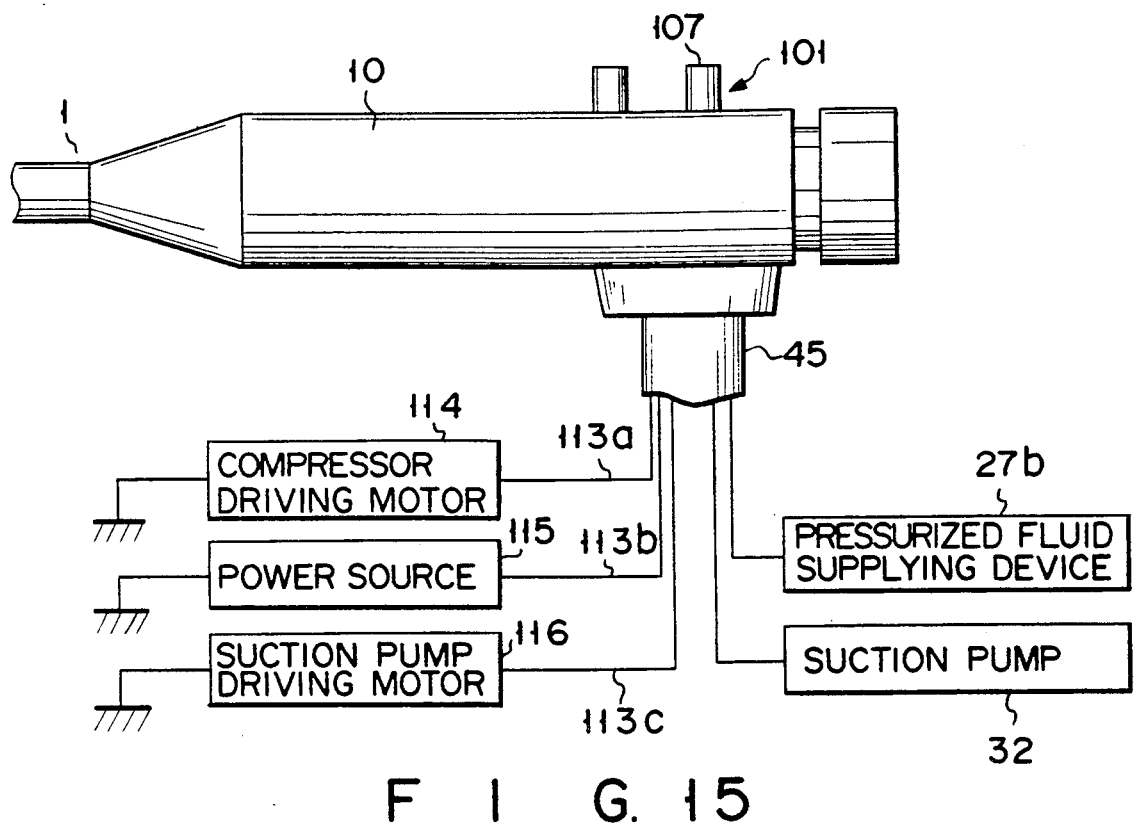
FIG. 15 is the operating unit and the external unit of the borescope apparatus according to the fourth embodiment of this invention.

FIGS. 9 and 10 show the second embodiment of this invention. In this embodiment, the structure of the bending portion 41 of the electronic borescope 1 is modified. In FIG. 9, reference numeral 51 denotes a flexible outer tube of the bending portion 41, in which a pair of cylindrical segments 52a and 52b are arranged opposite to each other in a spaced relation. A driving cylinder 53 is provided between the cylindrical segments 52a and 52b. A connecting arm 55 projects outwardly from one head 54a of the driving cylinder 53, and a connecting arm 56 projecting from the central portion of the cylindrical segment 52a is pivoted to the connecting arm 55 by means of a connecting pin 57. A piston rod inserting hole 58 is formed in the central portion of the other head 54b of the driving cylinder 53. The piston rod 60 of the piston 59 in the driving cylinder 53 extends outwardly through the piston rod inserting hole 58. A connecting arm 61 projecting from the central portion of the cylindrical segment 52b is pivoted to the piston rod 60 by means of a connecting pin 62. A tube connecting portion 63 is provided on the head 54a of the driving cylinder 53 and a link rod inserting hole 64 is formed therein. The other head 54b of the driving cylinder 53 has a tube connecting portion 65 and a link rod 66. A link rod 67 projecting in the opposite direction to that of the piston rod 60 of the piston 59 is inserted in the link rod inserting hole 64 of the head 54a so as to extend outward therefrom. A connecting arm 28 projecting from an end portion of the cylindrical segment 52a is pivotally connected to the extension of the link rod 60. A connecting arm 70 is pivoted to the an end portion of the cylindrical segment 52b by means of a connecting pin 71. A first air supplying tube 72 is connected to the tube connecting portion 63 of the head 54a, and a second air supplying tube 73 is connected to the tube connecting portion 65 of the head 54b.

Within the driving cylinder 53 is provided a spring member 74 which holds the piston 59 in a neutral position. First and second pressure chambers 75 and 76 are formed in the piston 59. In the end of the piston 52 at the side of the piston rod 60 is formed a commutating hole 77 communicating with the first pressure chamber 75. Likewise, in the other end of the piston 52 is formed a communicating hole 78 communicating with the second pressure chamber 76. Check valves 79 and 80 are prepared for the respective communicating holes 77 and 78. Formed in the outer peripheral surface of the driving cylinder 53 are jet ports 81 and 82 communicating with the outside of the outer tube 51.

Under the condition in which the bending knobs 37a and 37b of the first bending mechanism A of the operating portion 10 of the borescope 1 and the pressure control switch 39 of the second bending mechanism B are not operated, the driving cylinder 52 is held in the neutral position. Upon the operation of either one of the bending knobs 37a and 37b of the operating portion 10 of the borescope 1, said either one of the bending knobs 37a and 37b is connected to the suction pump 32. The sucking action from the second air supplying tube 73 causes the check valve 79 to close the communicating hole 77 as shown in FIG. 10 such that the suction force acts towards the head 54b of the piston 59 in the driving cylinder 53. As the piston 59 is moved towards the head 54b by this suction force, the piston rod 60, the link rod 66, the connecting arm 55 and the link rod 55 are respectively bent about the connecting pins 62, 71, 57 and 69 as shown in FIG. 10. This movement of the piston 59 effects the small bending operation in which only the bending portion 12 is curved downward in FIG. 10. When the first air supplying tube 72 is caused to communicate with the suction pump 32, to the contrary, the piston 59 is sucked towards the head 54a by the sucking action from the first air supplying tube 72. By the movement of the piston 59, the small bending operation is carried out in which only the bending portion 12 is bent upward in FIG. 10.

When the pressure control switch 39 corresponding to the required jet port is actuated, the fluid passage change-over valve 31 is changed to supply the compressed air discharged from the compressor 35 to the second air supplying tube 73 (or the first air supplying tube 72) through the reservoir 34, the pressure regulator 33, the fluid passage change-over valve 31, the air supplying tube 28 and the tube connecting terminal 25 of the connector 24 in succession. Accordingly, for example, the check valve 79 provided for the first pressure chamber 75 is opened by the pressure of the compressed air from the second air supplying tube 73 to eject the compressed air out of the jet port 81 via the communicating hole 77 and the first pressure chamber 75. The propelling force acting on the distal portion of the insertion section 2 of the borescope 1 performs the large bending operation in which the overall insertion section 2 of the borescope 1 is gradually bent downwardly from its distal end in FIG. 9.

FIGS. 11 to 14 show the third embodiment of this invention.

In this embodiment, cylindrical jet port members 20 and 44 are provided on the distal end portions of the bending portions 12 and 44 mounted on the flexible tube 4 including the inserting portion 5 of the guide tube 3 and the inserting portion 2 of the borescope 1 in the first embodiment. A first bending mechanism A and a second bending mechanism B have the substantially same structure, only the structure of the first bending mechanism A of the guide tube 3 being explained in reference to FIGS. 11 to 14 and the description of the structure of the second bending mechanism B being omitted.

In FIGS. 12 to 14, reference numeral 91 denotes a driving cylinder mounted on the inner peripheral face of the jet port member 20 on the distal end of the bending portion 12, and reference numeral 92 designates a piston in the driving cylinder 91. The distal ends of operating wires 16 of the first bend mechanism A of the guide tube 3 are fixed to the respective pistons 92, and the proximal ends of the wires 16 are also fixed to the inner peripheral face of the rearmost cylindrical segment 15. Within each driving cylinder 91 is provided a spring member 93 which holds the piston 92 in a neutral position. While the piston 92 is held in the neutral position, the corresponding jet port 21 formed in the jet port member 20 of the guide tube 3 is closed by the piston 92. As shown in FIG. 13, each driving cylinder 91 is provided with a connecting tube portion 94 of the air supplying tube 22. In the distal end of the cylinder body 91a of the driving cylinder 91 is formed a communicating hole 95 in communication with the connecting tube portion 94. Upon bending the first bending mechanism A of the guide tube 3, the required air supplying tube 22, for example, the upper air supplying tube 22 in FIG. 12 is connected to the suction device in accordance with the operation of the bending knob 37a and 37b. As the piston 92 in the driving cylinder 91 is moved in the sucking direction (in the leftward direction in FIG. 12), the small bending operation is carried out in which the distal end of the bending portion 12 is bent in a direction (upwardly in FIG. 12). Upon the operation of the pressure control switch 39, the pressurized fluid, for example, the compressed air discharged from the compressor 35 is supplied to the air supplying tube 22 which is located at the opposite side to the direction in which the bending occurs, for example, the lower air supplying tube 22 in FIG. 12. The piston 92 in the driving cylinder 91 is pushed against the biasing force of the spring member 93 in the right direction in FIGS. 12 and 13 thereby to open the jet port 21. In this open state, the compressed air flowing in the driving cylinder 91 and ejected from the jet port 21 produces a propelling force which moves the distal portion of the inserting portion 5 of the guide tube 3 in the direction opposite to the ejected direction of the compressed air such that the entire inserting portion 5 of the guide tube 3 is gradually bent from the distal end thereof.

In the second and third embodiments, since the borescope of such type is used that the bending portion of the insertion section is bent by the pressurized fluid, a borescope of another type, wherein the bending portion is bent by pushing or pulling the operating wire, can be used.

If the extending direction of the operating wire shown in FIG. 13 is reversed, and the cylinder is provided at the flexible portion, it may be possible to retract the operating wire and bend the bending portion by the fluid supplying operation in stead of the fluid sucking operation.

Figure 16:
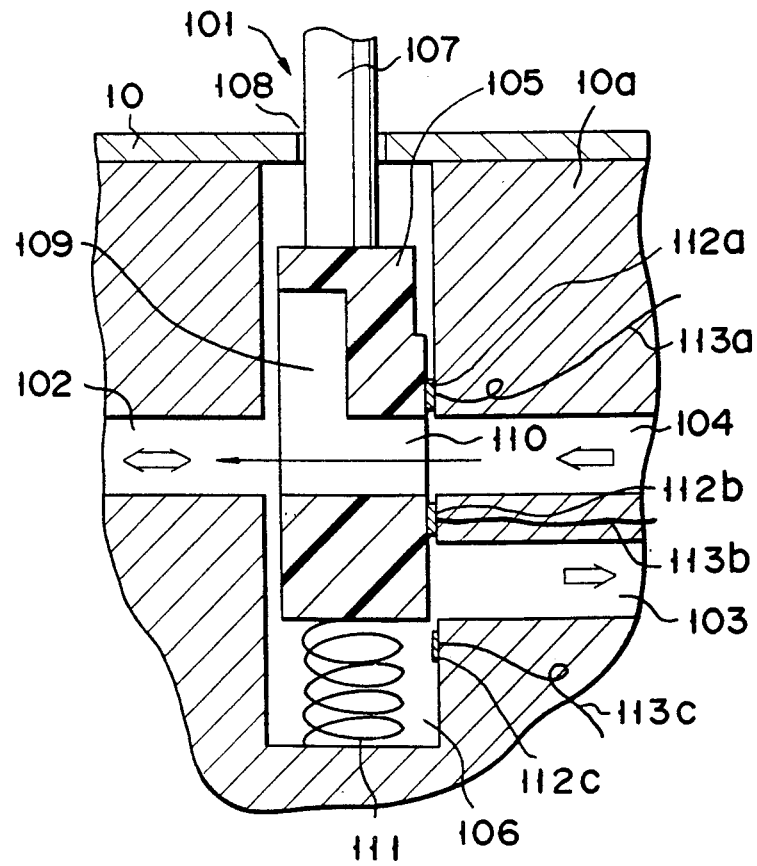
FIG. 16 is a cross-sectional view of the main part of a fluid passage change-over valve provided in the operating portion.
Figure 20:
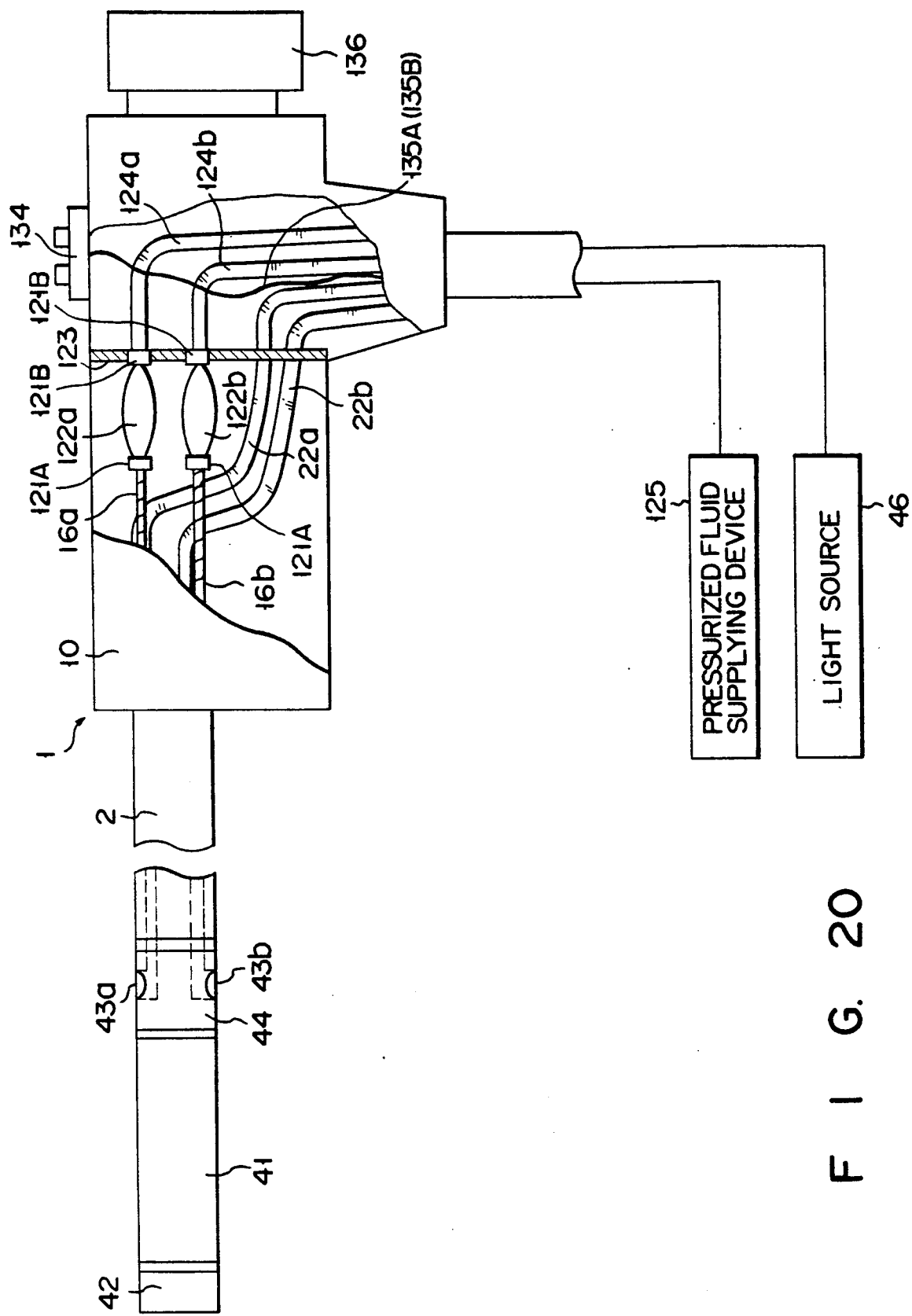
FIG. 20 is a diagrammatic view of the borescope unit and the external unit according to the fifth embodiment of this invention.

FIGS. 15 to 19 show the fourth embodiment of this invention. In the operating portion 10 of the borescope 1 is integrally assembled a fluid passage change-over valve (fluid control means) 101 which selects the fluid passage A led to the suction pump 32 and the fluid passage B led to the pressurized fluid supply device 27b. As shown in FIG. 16, the body 10a of the operating portion 10 is formed with a connecting hole 102 connected to the air supplying tube 22, a connecting hole 103 connected to the suction pump 32 and a connection hole 104 connected to the pressurized fluid supplying device 27b. The body 10a of the operating portion 10 is further provided, between the connecting hole 102 and the connecting holes 103 and 104, with an operation chamber 106 which houses a valve body 105 for changing the fluid passages. The operation chamber 106 extends substantially perpendicularly to the extensions of the connecting holes 102, 103 and 104. The valve body 105 is slidable vertically in the operation chamber 106 in FIG. 16. In this embodiment, a connecting hole 102 of the air supplying tube 22 is formed in one side wall of the operation chamber 106, and a connecting hole 103 of the suction pump 32 and a connecting hole 104 of the pressurized fluid supplying device 27b are formed in the other side wall of the operation chamber 106.

A push button 105 projects from the valve body 105 so as to extend through an opening 108 formed in the outer plate of the body 10a of the operating portion to the outside of the operation chamber 106. The valve body 105 is made of electrically conductive material, while the push button 107 of the valve body 105 is made of electrically insulating material. In the valve body 105 is formed a first communicating hole 109 extending in the moving direction of the valve body 105 at the side of the connecting hole 102 and is formed a second communicating hole 110 having the substantially same diameter of the connecting holes 103 and 104 at the side of these holes 103 and 104. Within the operation chamber 106 is set a spring member 111 which urges the valve body 105 upwardly in FIG. 16. On the inner wall of the operation chamber 106 at the side of the connecting holes 103 and 104 are arranged first, second and third contacts 112a, 112b and 112c. The first contact 112a is disposed above the connecting hole 104. The second contact 112b is located between the connecting holes 104 and 103. The third contact 112c is placed below the connecting hole 103. As shown in FIG. 17, the first contact 112a is connected to a driving motor 114 of the compressor 35 by a lead 113a, the second contact 112b, to a power source 115 by a lead 113b, and the third contact 112c, to a driving motor 116 of the suction pump 32.

Normally, the valve body 105 of the fluid passage change-over valve 101 is held in a state in which it is pressed against the upper wall of the operation chamber 106 by means of the biasing force of the spring member 111 as shown in FIG. 18 such that the communication between the connecting hole 102 connected by the valve body 105 to the air supplying tube 22 and the connecting hole 104 connected by the valve 105 to the pressurized fluid supplying device 27b is interrupted by the valve body 105. In this state, the valve body 105 is in contact with only the second contact 112b. Thus, the compressor 35 and the suction pump 32 are not operated.

When the push button 107 of the valve body 105 is depressed halfway, the valve body 105 is held in the substantially middle position in the operation chamber 106 against the biasing force of the spring member 111 as shown in FIG. 16. In this position, the connecting hole 102 communicating with the air supplying tube 22 is connected to the connecting hole 104 communicating with the pressurized fluid supplying device 27a through the first communication hole 109 and the second communication hole 110, and the valve body 105 contacts the second contact 112b and the first contact 112a to supply the electric current to the driving motor 114 of the compressor 35 through the valve body 105. As a result, the compressed air is supplied from the pressurized fluid supplying device 27b to the air supplying tube 22 to effect the large bending of the whole inserting portion 2 of the borescope 1.

Under the condition in which the push button 107 of the valve body 105 is depressed deepest, the valve body 105 is held in the lowest position in the operation chamber 106 against the biasing force of the spring member 111 as shown in FIG. 19. In this position, the connecting hole 102 communicating with the air supplying tube 22 is connected to the connecting hole 103 communicating with the suction pump 32 through the first communicating hole 109 and the second communication hole 110 of the valve body 105, and the valve body 105 contacts the second contact 112b and the third contact 112c thereby to supply the electric current to the driving motor 116 of the suction pump 32 through the valve body 105 to drive the suction pump 32. Then, the air in the driving cylinder 17 of the first bending mechanism A is sucked by the suction pump 32. As the piston 18 is moved in the driving cylinder 17, the wire 16 is pulled to perform the small bending of only the bending portion 41 of the borescope 1.

FIGS. 20 to 23 show the fifth embodiment of this invention in which the bending mechanism of the bending portion 41 of the borescope 1 is modified. Within the operating portion 10 of the borescope 1 are provided actuators 122a and 122b which comprise tubes made of elastic material such rubber and fixed at their both ends by fixing members 121A and 121B and cylindrical limiting members surrounding the tubes and which are radially expanded and axially shrunk when pressurized fluid such as compressed air is supplied thereto. According to the deformation of the actuators 122a and 122b, wires 16a and 16b are pulled or pushed to bend only the bending portion 41 to a small extent. A cylindrical jet port member 44 is fixed to the proximal end of the bending portion 44, and the overall inserting portion 2 of the borescope 1 can be bent by the ejection of the pressurized fluid such as compressed air from jet ports 43a and 43b.

In detail, the operating portion 10 of the borescope 1 houses an actuator holding plate 123 to which are fixed the fixing members 121B at the proximal ends of the actuators 122a and 122b. To the fixing members 121A are secured the proximal ends of the wires 16a and 16b for bending the bending portion 41. To one end of each of air supplying tubes for the actuators 124a and 124b is connected to the respective fixing member 122B affixed to the proximal end of the corresponding one of the actuators 122a and 122b. To the other ends of the air supplying tubes for the actuators 124a and 124b is secured a compressed fluid supplying device 125 provided through fluid control means with the compressor 35 and the reservoir 34. The proximal ends of a pair of air supplying tubes 126a and 126b are connected to the pressurized fluid supplying device 125. The distal end of the air supplying tube 126a is provided with a first fluid passage change-over valve 127A for a horizontally bending mechanism and the distal end of the air supplying tube 126b has a second fluid passage change-over valve 127B for a vertically bending mechanism. The first and second fluid passage change-over valves 127A and 127B comprise, for example, electro-pneumatic three port regulators and control the pressure applied in the actuators 122a and 122b and the flow of air supplied to the jet ports 43a and 43b.

The horizontally bending mechanism will now be explained. The proximal ends of a first bending air supplying tube 128a and a second bending air supplying tube 128b are connected to the first fluid passage change-over valve 127A. A third fluid supplying valve 129a such as a three port solenoid valve is connected to the distal end of the first bending air supplying tube 128a, and a fourth fluid passage change-over valve 129b such as a three port solenoid valve is also connected to the distal end of the second bending air supplying tube 129b. To the third fluid passage change-over valve 129a are connected the proximal ends of the air supplying tubes 22a communicating with the first jet ports 43 and the proximal ends of the air supplying tubes 124a communicating with the actuators 122a. To the fourth fluid passage change-over valve 129b are connected the proximal ends of the air supplying tubes 22b communicating with the second jet ports 43b and the proximal ends of the air supplying tube 124b communicating with the actuators 122b connected to the operating wires 16b. The selection of the fluid passages led to the jet ports 43a and 43b and the fluid passages led to the actuators 122a and 122b are conducted by the third fluid passage change-over valve 129a and the fluid passage change-over valve 129b. The vertically bending mechanism has the same structure as the horizontally bending mechanism, the explanation thereof being omitted.

As shown in FIG. 21, the operating portion 10 of the borescope 1 is provided with a change-over switch 131 for a bending/ejection change-over control mechanism 130 and an operating switch 134 having an encoder 133 for a bending-degree control mechanism 132. The change-over switch 131 is connected through a signal cable 135A to the third fluid passage change-over valve 129a for the horizontally bending mechanism and the fourth fluid passage change-over valve 129b for the horizontally bending mechanism. The encoder 133 is connected through a signal cable 135B to the first fluid passage change-over valve 127A for the horizontally bending mechanism and the second fluid passage change-over valve 127B for the vertically bending mechanism. The operation of the change-over switch 131 causes the bending/ejection change-over control mechanism 130 to actuate the third fluid change-over valve 129a for the horizontally bending mechanism and the fourth fluid change-over valve 129b for the vertically bending mechanism. The deformation of the actuators 122a and 122b performs the small bending of only the bending portion 41, and the ejection of air from the jet ports 43a and 43b carries out the large bending of the whole inserting portion 2 of the borescope 1. The operation of the encoder 133 enables the bend-degree control mechanism 132 to control the first fluid passage change-over valve 127A for the horizontally bending mechanism and the second fluid passage change-over valve 127B for the vertically bending mechanism so as to control the degree of curvature for the small bending and the large bending. Reference numeral 136 indicates an ocular for the borescope 1.

The operation of the borescope according to the fifth embodiment will be explained.

In order to effect the small bending of the bending portion 41 of the borescope 1 to the right side, for example, the change-over switch 131 is operated such that the fourth fluid passage change-over valve 129b causes the air supplying tube 124b to communicate with the pressurized fluid supplying device 125 in response to the signal from the bending/ejection change-over control mechanism 130. The compressed air discharged from the pressurized fluid supplying device 125 is supplied to the lower actuator 122b to swell it radially and to shrink it axially. Since the fixing member 121B of the actuator 122b is secured to the actuator holding plate 123, the axial shrinking force of the actuator 122b acts on the operation wire 16b to pull it leftward. As a result, the deformation of the actuator 122b carries out the small bending of only the bending portion 41 of the borescope 1 to the right side (downward in FIG. 22). In this case, the operation of the encoder 133 allows the bending-degree control mechanism 132 to control the first fluid change-over valve 127A. Thus, the pressure of the air supplied to the tube of the actuator 122b is controlled to adjust the bending degree at the time of small bending operation.

The overall insertion section 2 of the borescope 1 is largely bent by ejecting the compressed air from either one of the jet ports 43a and 43b formed in the rear part of the bending portion 41. In order to effect the large bending to the right side, for example, the bending/ejection change-over control mechanism 130 allows the third fluid passage change-over valve 129a to connect the air supplying tube 22a to the pressurized fluid supplying device 125 in response to the operation of the change-over switch 131. The compressed air discharged from the pressurized fluid supplying device 125 is supplied to the first jet port 43a, and the whole inserting portion 2 of the borescope 1 is greatly bent to the right, as shown in FIG. 23. Further, the first fluid passage change-over valve 127a is regulated by the bending-degree control mechanism 132 in response to the operation of the encoder 133 to control the amount of the compressed air supplied to the first jet port 43a. The degree of large bending is controlled by adjusting the ejected amount of the compressed air from the first jet port 43a.

Figure 24:
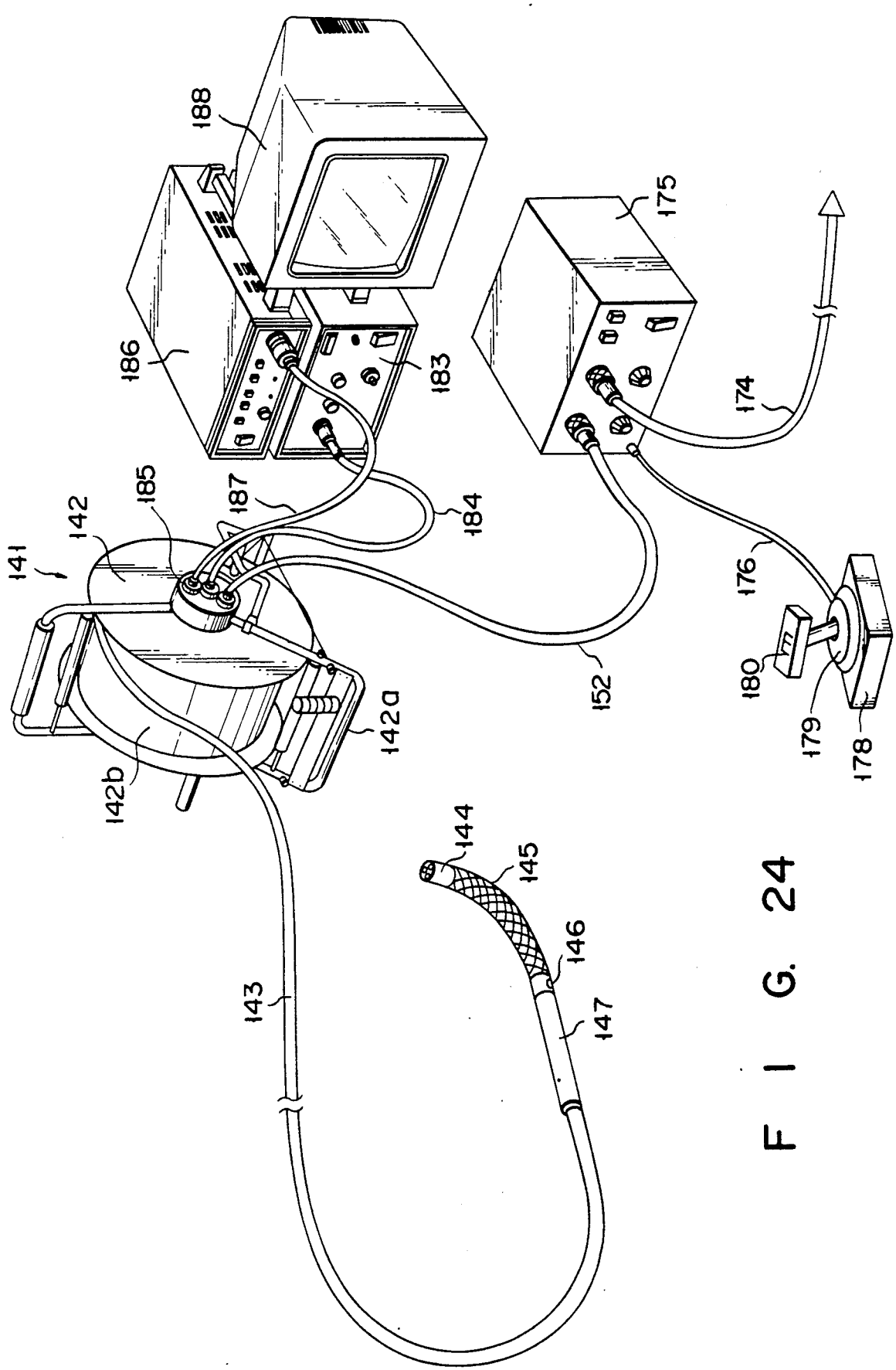
FIG. 24 is a perspective view of the borescope apparatus and the external unit according to the sixth embodiment of this invention.
Figure 25:
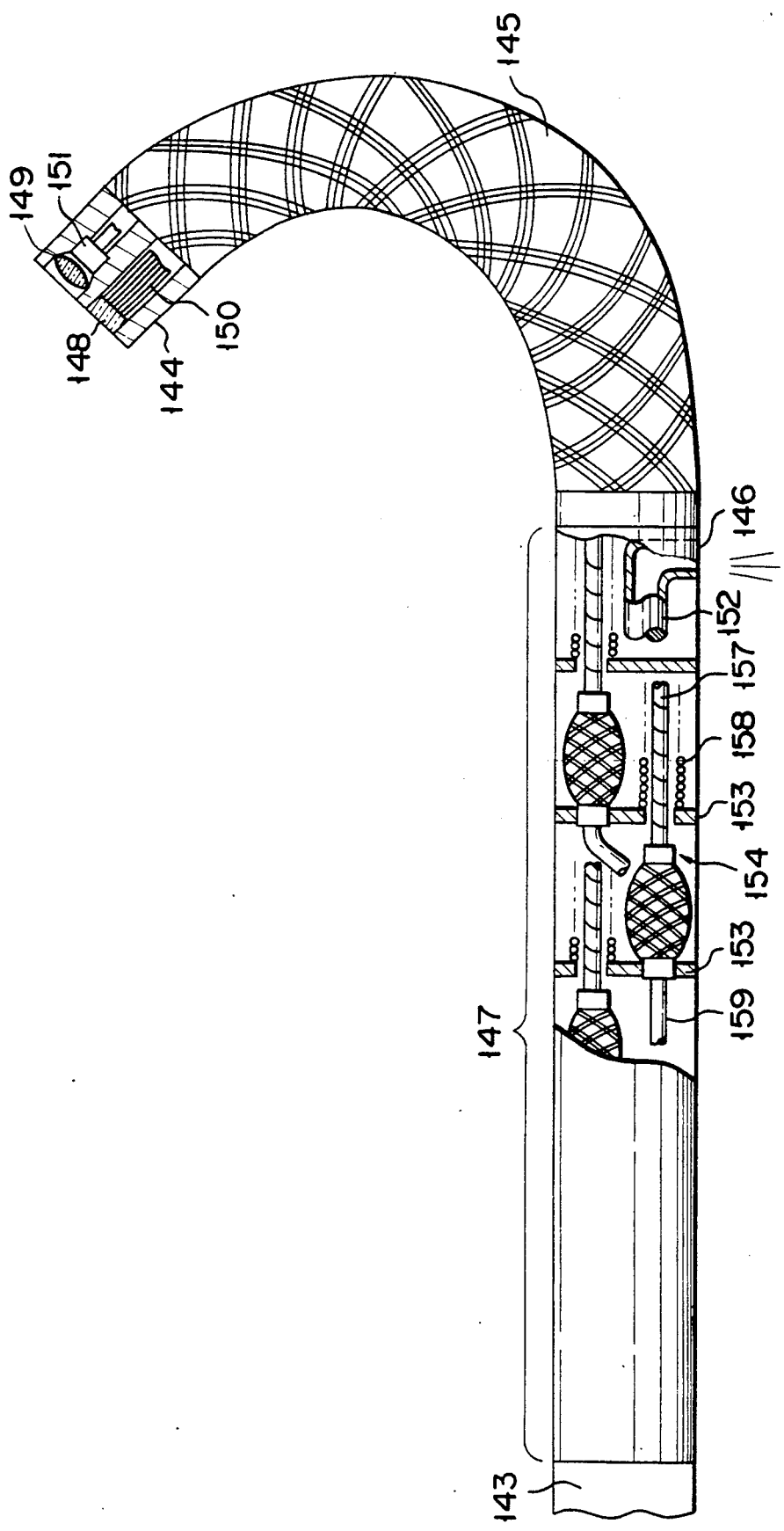
FIG. 25 is a partial sectional view of the inserting section of the borescope apparatus according to the sixth embodiment of this invention.

FIGS. 24 to 29 show the sixth embodiment of this invention. FIG. 24 is a general view of the overall borescope apparatus of this embodiment. Reference numeral 141 denotes the main body of the apparatus. The main body 141 is provided with a drum device 142. The drum device 142 has a supporting member 142a and a rotary drum 142b rotatably supported by the supporting member 142a. The proximal end portion of the insertion section 143 of the elongated borescope is wound around the rotary drum 142b adapted to be drawn out therefrom. To the distal end of the inserting portion 143 are connected a distal structural portion 144, a bending portion 145, jet nozzle 146 and actuator holding portion 147 in series. As shown in FIG. 25, an illuminating lens 148 and an objective lens 149 are mounted in the distal structural portion 144. Light guide fibers 150 are arranged in the inserting portion 143 such that the distal end faces of the fibers 150 face the inner face of the illuminating lens 148. A solid-state image sensing element (CCD) 151 faces the inner face of the objective lens 149. The distal end of a first jet air supplying tube 152 is connected to the jet nozzle 146. The jet nozzle 146 has a jet diameter of approximately 2 mm and its jet angle is set at about 90 degrees, for example. In the bending portion 145 are arranged a plurality of cylindrical segments which are connected to each other to be directed to four directions, for example, to the vertical directions and horizontal directions. The bending portion 145 contains four operating wires 157 for directing the cylindrical segments to the four directions (upward, downward, leftward and rightward). The distal ends of the wires 157 are fixed to the distal structural portion 144 such that these distal ends are spaced by 90 degrees in the circumferential direction of the distal structural portion 144. The proximal ends of the operating wires 157 extend in the actuator holding portion 147.

In the actuator holding portion 147, four actuator holding members 153 extend in the axial direction and are arranged in tandem. As shown in FIG. 26, each actuator holding member 153 has a pair of end walls 153a and 153b which are separated from each other and are substantially perpendicular to the axis of the actuator holding portion 147. Between the end walls 153a and 153b of each actuator holding member 153 is disposed an actuator 156 connected to an operating wire 157. The actuator 154 has an actuator body 156 which comprises a rubber tube covered with a braid formed by knitting fibers made of unextended material such as metal. Flanges 155a and 155b are secured to the respective ends of the actuator body 156. The flange 155a is fixed to the end wall 153a, but the other flange 155b is free. One end of a bending air supplying tube 159 is connected to the flange 155a so as to communicate with the interior of the rubber tube of the actuator body 156. The proximal end of the operating wire 157 is fixed to the other flange 155b.

When the pressurized fluid such as compressed air is supplied to the interior of the rubber tube of the actuator body 156 through the air supplying tube 159, the rubber tube of the actuator body 156 swells in the radial directions and shrinks in the axial directions. Thus, the deformation of the actuator bodies 156 pushes or pulls the operating wires 157 in the actuator body 156. Each operating wire 157 in the bending portion 145 extends through a guide member 158 which is formed by a closely wound coil and whose proximal end is fixed to the end wall 153b of the actuator holding member 153.

Figure 27:
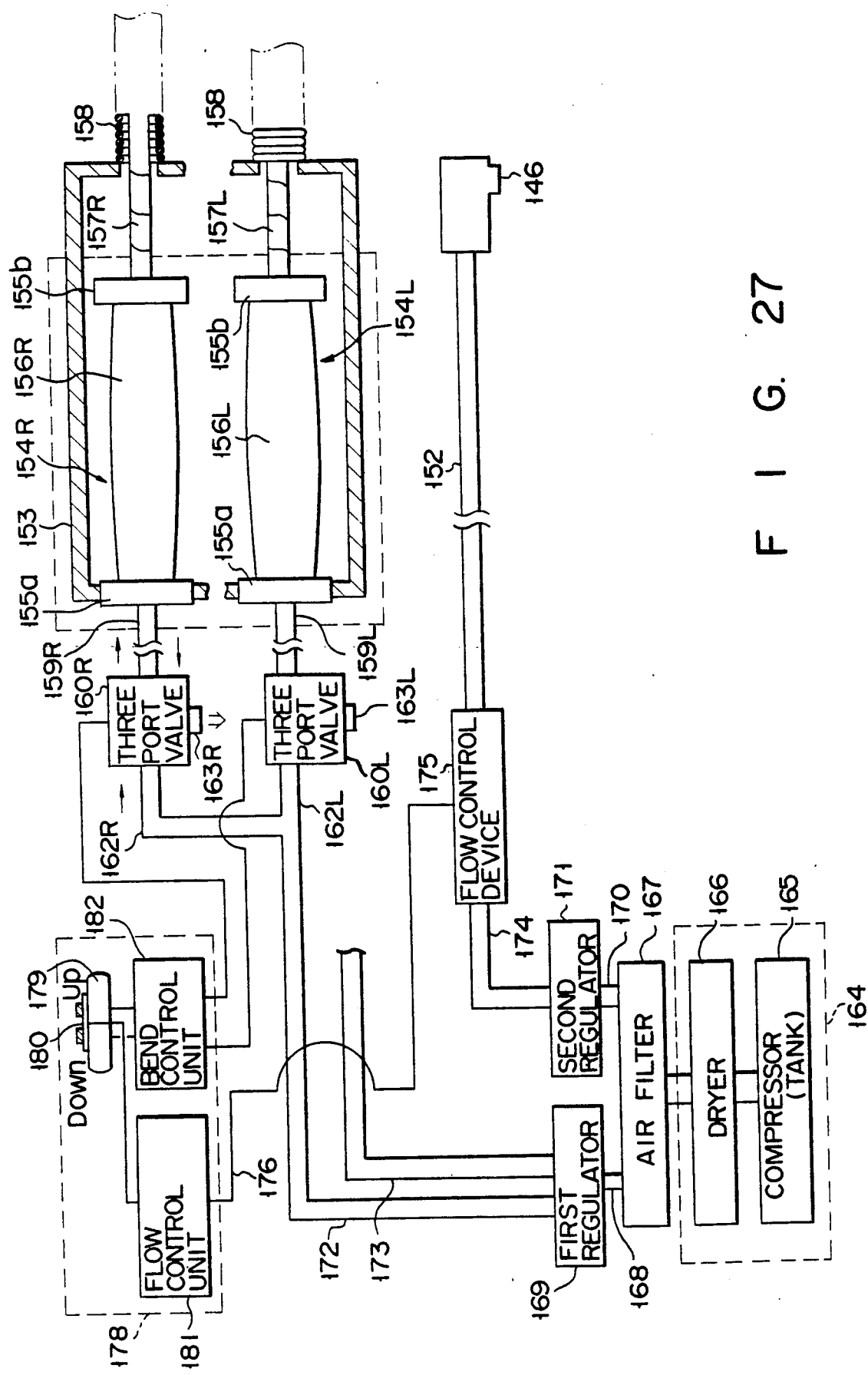
FIG. 27 is a block diagram of the driving mechanism of the borescope apparatus in FIG. 25.

For example, FIG. 27 shows a horizontally bending mechanism and the elements acting the rightward bending and the leftward bending are denoted by the reference numerals bearing R and L, respectively. The air supplying tube 159R of the actuator body 156R for the rightward bending and the air supplying tube 159L of the actuator body 156L for the leftward bending are connected to first ports of three port valves 160R and 160L, respectively. To second ports of the three port valves 160R and 160L are connected air supplying tubes 162R and 162L, respectively. The connection is made between third ports and outlets 163R and 163L, respectively.

Reference numeral 164 denotes a pressurized fluid source which houses a compressor 165 provided with a tank, a dryer 166 and other devices. An air filter 167 is connected to the dryer 166 of the pressurized fluid source 164. To the air filter 167 are connected a first regulator 169 through an air supplying tube 168 and a second regulator 171 through an air supplying tube 170.

An air supplying tube 172 commonly used for the leftward and rightward bending and an air supplying tube 173 commonly used for the upward and downward bending are connected at their respective ends to the first regulator 169. Air supplying tubes 162R and 162L are connected to the other ends of the common air supplying tube 173 for the leftward and rightward bending. Air supplying tubes 162U and 162D (not shown) are connected to the other ends of the common air supplying tube 173 for the upward and downward bending.

One end of a second jet air supplying tube 174 is connected to the first regulator 169. The other end of the second jet air supplying tube 174 is connected to the main body of a flow control device 175.

To the flow control device 175 are connected the proximal end of the first jet air supplying tube 152 and a controller unit 178 through a connection cord 176. The controller unit 178 is provided with a bend control knob 179 such as a joystick. The bend control knob 179 has a flow control switch 180 of, for example, a push button type. The controller unit 178 contains a flow control unit 181 and a bend control unit 182. To the flow control unit 181 are connected the flow control switch 180 and the flow control device 175. Connected to the bend control unit 182 are the three port valves 160R and 160L for the horizontal bending and the three port valves 160U and 160D (not shown) for the vertical bending. The flow control device 175 is controlled by the flow control switch 180 of the controller unit 178 to regulate the amount of flow of the fluid ejected from the jet nozzle 146. Upon operating the bend control knob 179 of the controller unit 178, the operation signal is input to the bend control unit 182. In response to the input signal, the bend control unit 182 operates the three port valves 160R and 160L for the horizontal bending and the three port valves 160U and 160D for the vertical bending, hereby effecting the small bending of only the bending portion 145.

In FIG. 24, reference numeral 185 designates the connecting end portion of the main body 141 of the borescope apparatus. To the connecting end portion 185 are connected the connecting end portion of the jet air supplying tube 152, one end of a universal cord 184 and one end of a connection cord 187. The other end of the universal cord 184 is detachably connected to a light source device 183, and the other end of the connection cord 187 is also detachably connected to a control unit 186. A monitoring device is connected to the control unit 186.

The operation of the borescope apparatus according to the sixth embodiment will be explained.

Figure 28:
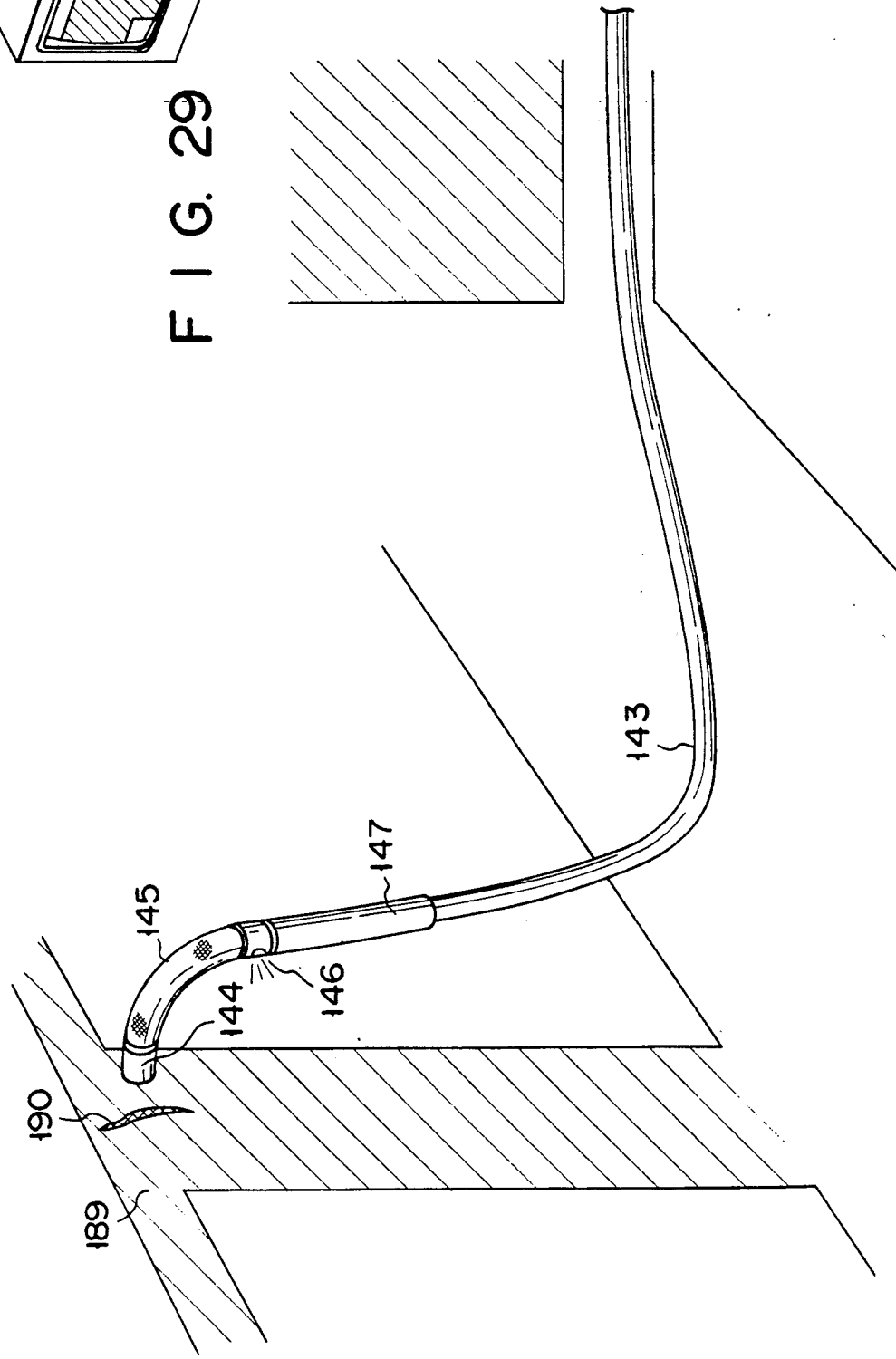
FIG. 28 is a perspective view of the operating borescope apparatus in FIG. 25.
Figure 29:
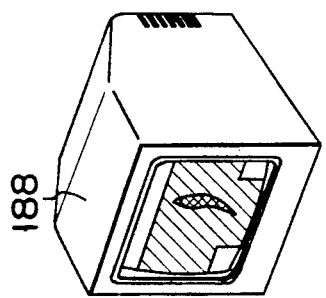
FIG. 29 is a perspective view of a monitoring device.

When the borescope apparatus is used, the inserting portion 143 of the borescope is drawn out of the rotary drum 142b and is introduced to the position to be observed. Thereafter, in this state, the compressed air is ejected from the jet nozzle 146 to raise the distal end of the inserting portion 143. The ejection of the compressed air is controlled by the flow control switch 180 of the controller unit 178. In other words, the flow control device 175 is controlled by the flow control switch 180 and properly regulates the flow of the compressed air introduced from the pressurized fluid source 164 into the first jet air supplying tube 152 through the air filter 167, the air supplying tube 170, the second regulator 171 and the second jet air supplying tube 174, thus adjusting the jet flow from the jet nozzle 146. In the large-bend state in which the distal end of the inserting portion 143 is raised to the required location, the small bending can be carried out in which only the bending portion 145 is bent. The small bending operation is performed by the operation of the bend control knob 179 of the controller unit 178. Namely, when the bend control knob 179 of the controller unit 178 is operated, the operation signal is input to the bend control unit 182. In response to the input signal, the bend control unit 182 operates the three port valves 160R and 160L for the horizontal bending and the three port valves 160U and 160D for the vertical bending. In this case, the first ports and the third ports of the three port valves 160R and 160L for the horizontal bending and the three port valves 160U and 160D are normally connected to each other, and the bending portion 145 is straightened and held in a neutral state. When, for example, the first and second ports of the three port valve 160R for the rightward bending are connected to each other by the operation of the bend control knob 179, the compressed air supplied from the pressurized fluid source 164 through the air filter 167, the air supplying tube 168, the first regulator 169, the common air supplying tube 172 for the horizontal bending and the air supplying tube 159R is introduced from the bend air supplying tube 159R into the actuator body 156R for the rightward bending through the three port valve 160R. In this case, therefore, the operating wire 157 for the rightward bending is pulled leftward in FIG. 27 upon the deformation of the actuator body 156R for the rightward bending, and the movement of the operating wire 157 effects the small bending in which only the bending portion 145 is bent. The image through the borescope, such as a crack in the interior of a structure 189 as shown in FIG. 28, can be observed on the monitoring device 88 as shown in FIG. 29.

The pressure of the fluid flowing through the air supplying tubes 172, 173 and 174 are adjusted by the first and second regulators 169 and 171.

A feedback circuit (not shown) is housed in the flow control device 175 such that, when the flow rate is changed in the pressurized fluid source 164, jet flow rate ejected from the jet nozzle 146 is controlled to a value set by the fluid control unit 181. This prevents the change of the level of the raised distal end of the inserting portion 143.

When the distal end of the inserting portion 143 is raised by ejecting the compressed air from the jet nozzle 146 in the state of the small bending in which only the bending portion 145 is bent, the small bend mechanism is driven under a constant pressure by the first regulator 169, and the change of the bending speed is prevented.

Since, in this embodiment, the small bending for bending only the bending portion 145 of the insertion section 143 of the borescope and the large bending for bending the whole distal end of the insertion section 143 by means of the jet air from the jet nozzle 146 are selected when required, the operativeness of the insertion section 143 of the borescope is much more improved than that of the conventional one, and the inserting portion is more easily used than the conventional inserting portion.

Further, the fluid passage between the pressurized fluid source 164 and the jet nozzle 146 and the fluid passage between the pressurized fluid source 164 and the actuators 154 connected to the respective wires 157 of the bending portion 145 are separately provided. Therefore, the small bending for bending only the bending portion 145 and the large bending for bending the overall distal end of the insertion section 143 effected by the air jet from the jet nozzle 146 can be carried out simultaneously, thus widening the observation range.

In this embodiment, the actuator holding portion 147 is disposed close to the bending portion 145 of the insertion section 143, and the actuators 154 connected to the operating wires 157 of the bending portion 145 are arranged in the actuator holding portion 147. Thus, loosening of the operating wires 157 and the like is reduced even when the borescope has a long insertion section 143, and the bending operation is accurately performed. Further, a plurality of the actuators 154 are arranged in series in the axial direction in the actuator holding portion 147. This reduces the outer diameter of the inserting portion 143 and renders it small. The actuator is not limited to this embodiment but may be of piston type or may have other structures.

Figure 30:
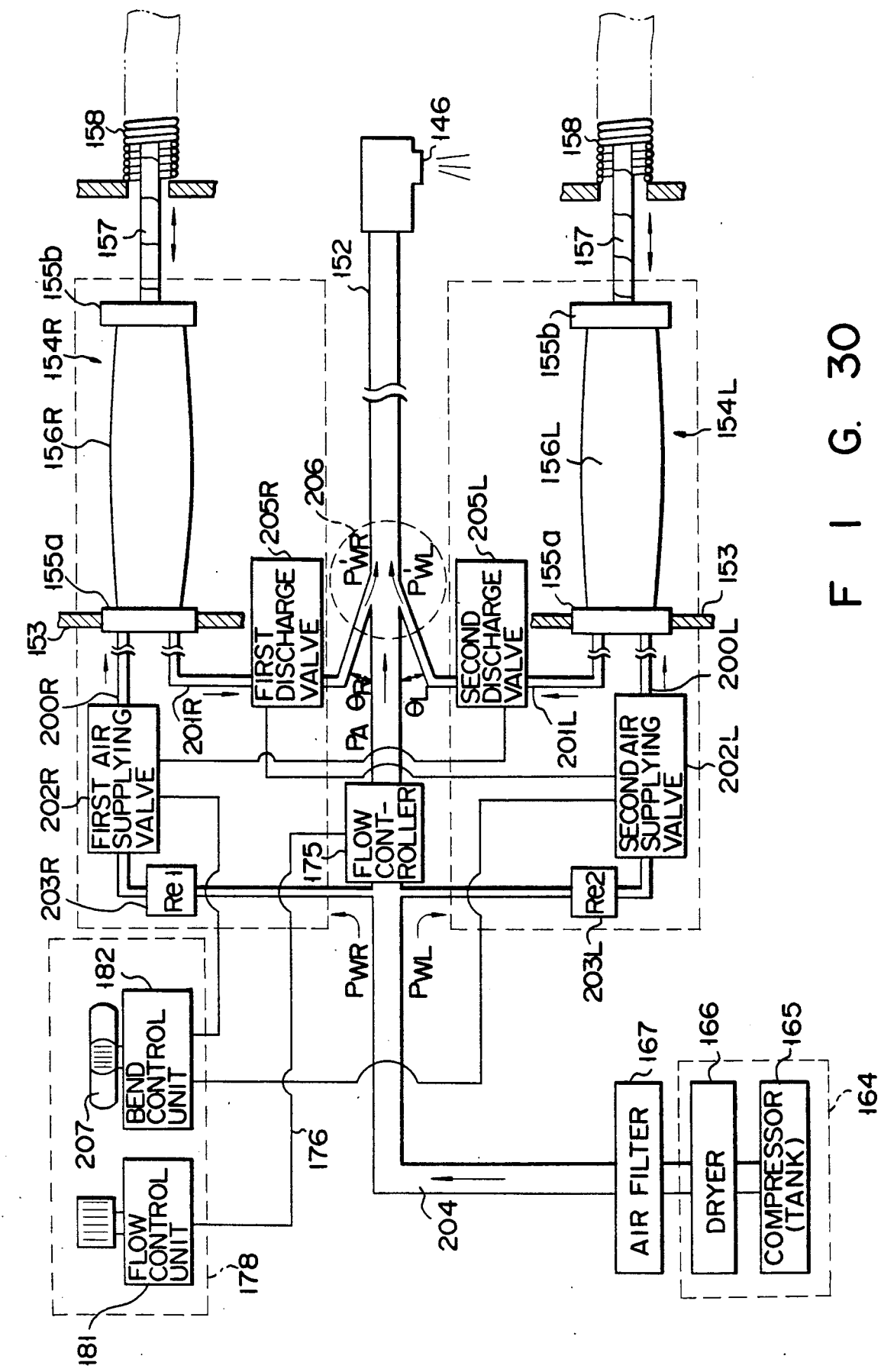
FIG. 30 is a block diagram of the driving mechanism of the borescope apparatus according to the seventh embodiment of this invention.

FIG. 30 shows the seventh embodiment. In this embodiment, the discharge passage from the actuators 154R and 154L which bend the bending portion 145 is connected to the jet air supplying tube 152 which supplies the compressed air to the jet nozzle 146 of the embodiment 6, and a part of the air supplying passage to the jet nozzle 146 and a part of the air supplying passage to the actuators 154R and 154L are made common. Namely, one end of an air supplying tube 200R for bending and one end of a discharge tube 201R are connected to the flange 155a of the actuator body 156R for bending rightward in such a manner that these ends communicate with the interior of the rubber tube of the actuator body 156R. Similarly, one end of an air supplying tube 200L for bending leftward and one end of a bending air supplying tube 201L are connected to the flange 155a of the actuator body 156L so as to communicate with the interior of the rubber tube of the actuator body 156L.

The other end of the air supplying tube 200R for bending rightward is connected to a common air supplying tube 204 through a first air supplying valve 202R, a first regulator 203R in succession. The other end of the air supplying tube 200L for bending leftward is similarly connected to the common air supplying tube 204 through a second air supplying valve 202L and a second regulator 203L. The first regulator 203R and the second regulator 203L keep the pressure acting to the bending mechanisms constant.

One end of the common air supplying tube 204 is connected to the air filter 167 coupled with the pressurized fluid source 164. The other end of the air supplying tube 204 is connected to the fluid control device 175. The connecting portion of the bending air supplying tubes 200R and 200L and the air supplying tube 204 is disposed at the upstream side of the connecting portion between the air supplying tube 204 and the fluid control device 175.

The other end of the discharge tube 201R for bending rightward is connected to an intermediate portion of the first jet air supplying tube 152 through the first discharge valve 205R. The other end of the discharge tube 201L for bending leftward is likewise connected to the intermediate portion of the first jet air supplying tube 153 through the second discharge valve 105L. At the merging portion 206 of the discharge tubes 201R and 201L and the first jet air supplying tube 152, the axes of the discharge tubes 201R and 201L are directed downstream of the air supplying tube 152 and are inclined at acute angles with respect to the axis of the air supplying tube 152 such that the air flow in the jet air supplying tube 152 sucks the air from the discharge tubes 201R and 201L to produce the suction effect (Venturi effect). Reverse-flow prevention mechanisms are provided in the first and second discharge valves 205R and 205L.

The flow control device 175 has fluid-flow correcting feedback control means (not shown) for preventing pressure variation occurring when the bending portion 145 is operated during the ejection of the compressed air from the jet nozzle 146.

The bend control unit 182 of the controller unit 178 controls the opening and closing timing of the first air supplying valve 202R, the second air supplying valve 202L, the first discharge valve 205R and the second discharge valve 205L in accordance with the movement of the bending control knob 207 with the result that the air supply to and the air discharge from the actuators 154R and 154L are controlled. Therefore, the degree of the bend of the bending portion 145 is controlled. The opening and closing timing is shown in the following table. In this case, the pressure Po of the pressurized fluid source 164 is larger than the sum of the maximum bending pressure max $P_{WR}$ (or max $P_{WL}$) and the maximum air supplying pressure max $P_A$. Namely, $$Po > max\ P_{WR} + max\ P_A\ (or\ max\ P_A)$$

| ACTUATORS | | RIGHT-WARD BENDING | LEFT-WARD BENDING | ONLY JET EJECTION | JET EJECTION + R BENDING | JET EJECTION + L BENDING |
|---|---|---|---|---|---|---|
| R | FIRST AIR SUPPLY VALVE | OPEN $Po > P_{WR}$ | CLOSED | CLOSED | OPEN $Po > P_{WR} + P_A$ | CLOSED |
|  | FIRST AIR DISC. VALVE | CLOSED | OPEN | CLOSED | CLOSED | OPEN $Po > P_{WL} + P_A$ |
| L | FIRST AIR DISC. VALVE | OPEN | CLOSED | CLOSED | OPEN DISCHARGE BY SUCTION | CLOSED |
|  | FIRST AIR SUPPLY | CLOSED | OPEN $Po > P_{WL}$ | CLOSED | CLOSED | OPEN DISCHARGE BY SUCTION |

-continued

| ACTUATORS | | RIGHT-WARD BENDING | LEFT-WARD BENDING | ONLY JET EJECTION | JET EJECTION + R BENDING | JET EJECTION + L BENDING |
|---|---|---|---|---|---|---|
| | VALVE | | | | | |
| FLOW CONTROLLER | | CLOSED | CLOSED | OPEN CONTROLLED BY FLOW CONT. UNIT | OPEN | OPEN |
| controller | | | | | | |

When the bending portion 145 is bent rightwars, the first air supplying valve 202R is opened and the air is supplied to the actuator 154R for rightward bending. The actuator 154R is shrunk in the axial direction to pull the operating wire 157R. At the same time, the second discharge valve 205L is opened and the air is discharged from the actuator 154L for bending leftward. Thus, the operating wire 157L for bending leftward is loosened such that the bending portion 145 is easily bent rightward. The air discharged from the actuator 154L is returned to the first jet air supplying tube 152.

In the seventh embodiment, the discharge passage from the actuator 154 is connected to the jet nozzle 146 of the sixth embodiment and the common passage is used for supplying the air to the jet nozzle 146 and the actuator 154. This simplifies the structure of the air supplying mechanisms and minimizes the pressure fluid source 164.

This invention is not limited to the above embodiments but various modifications ar available within the scope of this invention.

What is claimed is:

1. A borescope apparatus comprising:
    an insertion section having a bending portion and a flexible portion;
    jet ports formed in a distal end of either one of said bending portion and said flexible portion;
    bending means for bending said bending portion under pressure of supplied fluid;
    pressurized fluid supplying means for supplying said fluid to said jet ports and said bending means; and
    flow control means for controlling said fluid supplied to said jet ports and said bending means.

2. The apparatus according to claim 1, wherein said bending means comprises:
    a plurality of cylindrical segments provided in tandem in said bending portion and linked to each other;
    operating wires each having on end connected to front most portions of the cylindrical segments; and
    fluid actuators connected to the other ends of said operating wires and pulling and pushing said operating wires by pressure change of said fluid.

3. The apparatus according to claim 2, wherein said fluid actuator comprises a cylinder having a head to which said fluid is supplied and a piston to which said operating wire is connected.

4. The apparatus according to claim 3, wherein said jet port communicates with an inner space of said cylinder such that said fluid in said cylinder is ejected from said jet port when said piston pushes said operating wire under the pressure of said fluid and approaches the head of said cylinder.

5. The apparatus according to claim 4, wherein said fluid actuator has a spring for urging said piston in a direction in which said operating wire is pulled.

6. The apparatus according to claim 2, wherein said fluid actuator is provided with a rubber tube and restricting means for restricting axial elongation of said rubber tube.

7. The apparatus according to claim 1, wherein said bending means comprises:
    at least two cylindrical segments spaced apart from each other;
    a cylinder having heads to which said fluid is supplied;
    a piston slidably inserted in said cylinder;
    a first arm axially extending from one head of said cylinder and pivoted to a peripheral wall on a plane on which a central line of one of said cylindrical segments lies;
    a first rod axially extending from the other head of said cylinder and pivoted to a peripheral wall substantially perpendicular to said plane of said one of said cylindrical segments;
    a second arm provided on said piston, passing through said other head, extending in series with said first arm, and pivoted to a peripheral wall of the other cylindrical segment; and
    a second rod provided on said piston, passing through said one of said cylindrical segments, extending in series with said first rod, and pivoted to a peripheral wall of said one of said cylindrical segments.

8. The apparatus according to claim 7, wherein said jet port communicates with a space in said cylinder.

9. The apparatus according to claim 1, further comprising suction means for sucking said fluid supplied to said bending means.

10. The apparatus according to claim 9, wherein said fluid actuator has a compressor unit, said suction means has a suction pump, and said fluid control means has fluid passage change-over means for selectively connecting said fluid actuator to either one of said compressor unit and said suction pump.

11. The apparatus according to claim 10, which further comprises an operating section connecting to a proximal end of said insertion section, and wherein said fluid passage change-over means has a manually operated fluid passage change-over valve provided on said operating section.

12. The apparatus according to claim 11, wherein said fluid passage change-over valve has means for operating either one of said suction pump and said compressor unit in response to movement of said fluid passage change-over valve.

13. The apparatus according to claim 1, wherein said fluid control means comprises bending angle adjusting means for adjusting bending angles of said bending portion and said flexible portion and flow adjusting means for adjusting flow of said fluid ejected from said jet port.

14. The apparatus according to claim 13, wherein said pressurized fluid supplying means comprises a compressor unit, a first passage connected to said compressor unit and communicating with said fluid actuator and a second passage connected to said compressor unit and communicating with said jet port, said bending angle adjusting means has a first fluid control valve provided for said first passage, and said flow adjusting means has a second fluid control valve provided for said second passage.

15. The apparatus according to claim 14, wherein said pressurized fluid supplying means has a third passage for discharging said fluid from said fluid actuator, said third passage merging said second passage at an acute angle so as to flow said fluid in said third passage in said second passage.

16. The apparatus according to claim 1, further comprising a guide tube detachably mounted on said flexible portion of said insertion section, said guide tube comprising an annular operating section, an annular flexible portion and an annular bending portion.

17. The apparatus according to claim 16, wherein said guide tube comprises a fluid jet port provided in an distal end of either one of said annular bending portion and said annular flexible portion, bending means for bending said annular bending portion under pressure of the supplied fluid, pressurized fluid supplying means for supplying said fluid to said jet port and said bending means, and fluid control means for controlling said fluid supplied to said jet port and said bending means.

18. The apparatus according to claim 1, further comprising a drum unit for taking up and accommodating said insertion section.

19. A borescope apparatus comprising:

a borescope having an insertion section with a flexible portion;

a guide tube detachably mounted on the flexible portion of said insertion section, the guide tube including an annular operating section, an annular flexible portion, an annular bending portion, a fluid jet port provided in an distal end of either one of the annular bending portion and the annular flexible portion, and bending means for bending the annular bending portion under pressure of supplied fluid;

pressurized fluid supplying means for supplying the fluid to said jet port and said bending means; and fluid control means for controlling the fluid supplied to said jet port and said bending means.

20. The apparatus according to claim 19, wherein said bending means comprises a plurality of cylindrical segments provided in tandem in said bending portion and linked to each other, operating wires each having one end connected to front most portions of the cylindrical segments, and fluid actuators connected to the other ends of said operating wires and pushing and pulling said operating wires by pressure change of said fluid.

21. The apparatus according to claim 20, wherein said fluid actuator comprises a cylinder having a head to which said fluid is supplied and a piston to which said operating wire is connected.

22. The apparatus according to claim 21, wherein said jet port communicates with an inner space of said cylinder such that said fluid in said cylinder is ejected from said jet port when said piston pushes said operating wire under the pressure of said fluid and approaches the head of said cylinder.

23. The apparatus according to claim 22, wherein said fluid actuator has a spring for urging said piston in a direction in which said operating wire is pulled.

* * * * *